United States Patent
Sato

(10) Patent No.: US 10,868,326 B2
(45) Date of Patent: Dec. 15, 2020

(54) FUEL CELL

(71) Applicant: NISSAN MOTOR CO., LTD., Yokohama (JP)

(72) Inventor: Kazuyuki Sato, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/615,962

(22) PCT Filed: May 25, 2017

(86) PCT No.: PCT/JP2017/019496
§ 371 (c)(1),
(2) Date: Nov. 22, 2019

(87) PCT Pub. No.: WO2018/216159
PCT Pub. Date: Nov. 29, 2018

(65) Prior Publication Data
US 2020/0176804 A1 Jun. 4, 2020

(51) Int. Cl.
*H01M 4/86* (2006.01)
*H01M 8/1213* (2016.01)
*H01M 8/2425* (2016.01)
*H01M 8/0232* (2016.01)
*H01M 8/0282* (2016.01)
(Continued)

(52) U.S. Cl.
CPC ....... *H01M 8/2425* (2013.01); *H01M 4/8626* (2013.01); *H01M 4/8636* (2013.01); *H01M 4/8642* (2013.01); *H01M 8/0232* (2013.01); *H01M 8/0282* (2013.01); *H01M 8/1213* (2013.01); *H01M 8/1226* (2013.01); *H01M 2004/8684* (2013.01); *H01M 2008/1293* (2013.01)

(58) Field of Classification Search
None
See application file for complete search history.

(56) References Cited

U.S. PATENT DOCUMENTS

| 2005/0058881 A1* | 3/2005 | Goebel | H01M 4/881 429/474 |
|---|---|---|---|
| 2009/0092885 A1 | 4/2009 | Erkikstrup et al. | |
| 2012/0205042 A1 | 8/2012 | Erkikstrup et al. | |

FOREIGN PATENT DOCUMENTS

| EP | 0 361 383 A1 | 4/1990 |
|---|---|---|
| JP | 6-349506 A | 12/1994 |
| JP | 7-45295 A | 2/1995 |

(Continued)

*Primary Examiner* — Jonathan Crepeau
(74) *Attorney, Agent, or Firm* — Foley & Lardner LLP

(57) ABSTRACT

A fuel cell FC includes a cell structure 1 in which an anode electrode layer 11, an electrolyte layer 13 and a cathode electrode layer 15 are stacked. The anode electrode layer 11 is arranged in the middle, and has an electrode reacting part 11 having a thermal expansion coefficient greater than a thermal expansion coefficient of the electrolyte layer, and an outer peripheral part 113 arranged adjacent to the electrode reacting part 111 on an outer periphery of the electrode reacting part 111, the outer peripheral part 113 having a thermal expansion coefficient smaller than the thermal expansion coefficient of the electrode reacting part 111. The fuel cell FC is arranged on the anode electrode layer side of the cell structure 1, and further includes a metallic supporting plate 2 that supports the cell structure 1.

12 Claims, 25 Drawing Sheets

(51) Int. Cl.
*H01M 8/1226* (2016.01)
*H01M 8/124* (2016.01)

(56) References Cited

FOREIGN PATENT DOCUMENTS

| | | |
|---|---|---|
| JP | 2009-146882 A | 7/2009 |
| JP | 2011-124148 A | 6/2011 |
| KR | 10-2011-0062935 * | 6/2011 |

* cited by examiner

FUEL CELL

TECHNICAL FIELD

The present invention relates to a fuel cell.

BACKGROUND ART

A fuel cell stack unit configured to prevent gas leak to its surroundings has been proposed from before (See Patent Document 1). This fuel cell stack unit has a porous metallic support. The support includes a sealing that has a sealing depth extending from its upper face to at least its bottom face. The sealing is arranged along the periphery of the porous metallic support, and is impermeable against gas that moves on a flat plane of the porous metallic support. Furthermore, the sealing is provided by local melting.

CITATION LIST

Patent Document

Patent Document 1: JP2009-146882A

SUMMARY OF INVENTION

Technical Problem

However, even with the fuel cell stack unit disclosed in Patent Document 1, the electrolyte layer may crack, and there has been the need for improvement to enhance gas barrier properties.

The present invention has been made in view of such a problem in the prior art. It is an object of the present invention to provide a fuel cell capable of maintaining a good gas barrier property.

Solution to Problem

The present inventor conducted an intensive study in order to achieve the above-described object. As a result, he has found that the above-described object is achieved by accomplishing a structure including an anode electrode layer having a predetermined electrode reacting part and an outer peripheral part. The present invention has been thus completed.

Advantageous Effects of Invention

According to the present invention, it is possible to provide a fuel cell that can maintain a good gas barrier property.

DESCRIPTION OF EMBODIMENTS

Hereinafter a fuel cell according to an embodiment of the present invention will be described with reference to the drawings. The dimensions of the drawings referred to in the following embodiments are exaggerated for descriptive reasons and may be different from the actual dimensions.

First Embodiment

Figure 1:
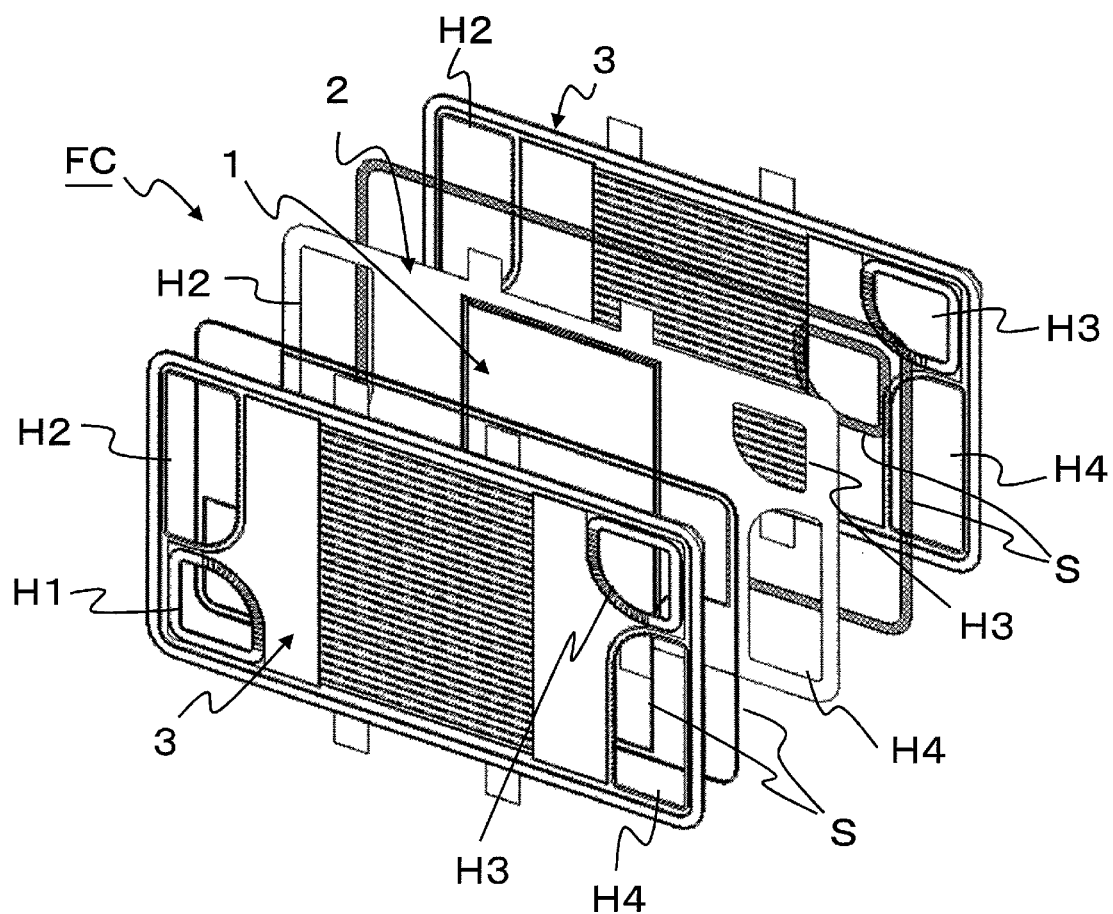
FIG. 1 is an explosive perspective view of a fuel cell for illustrating a first embodiment.
Figure 2:
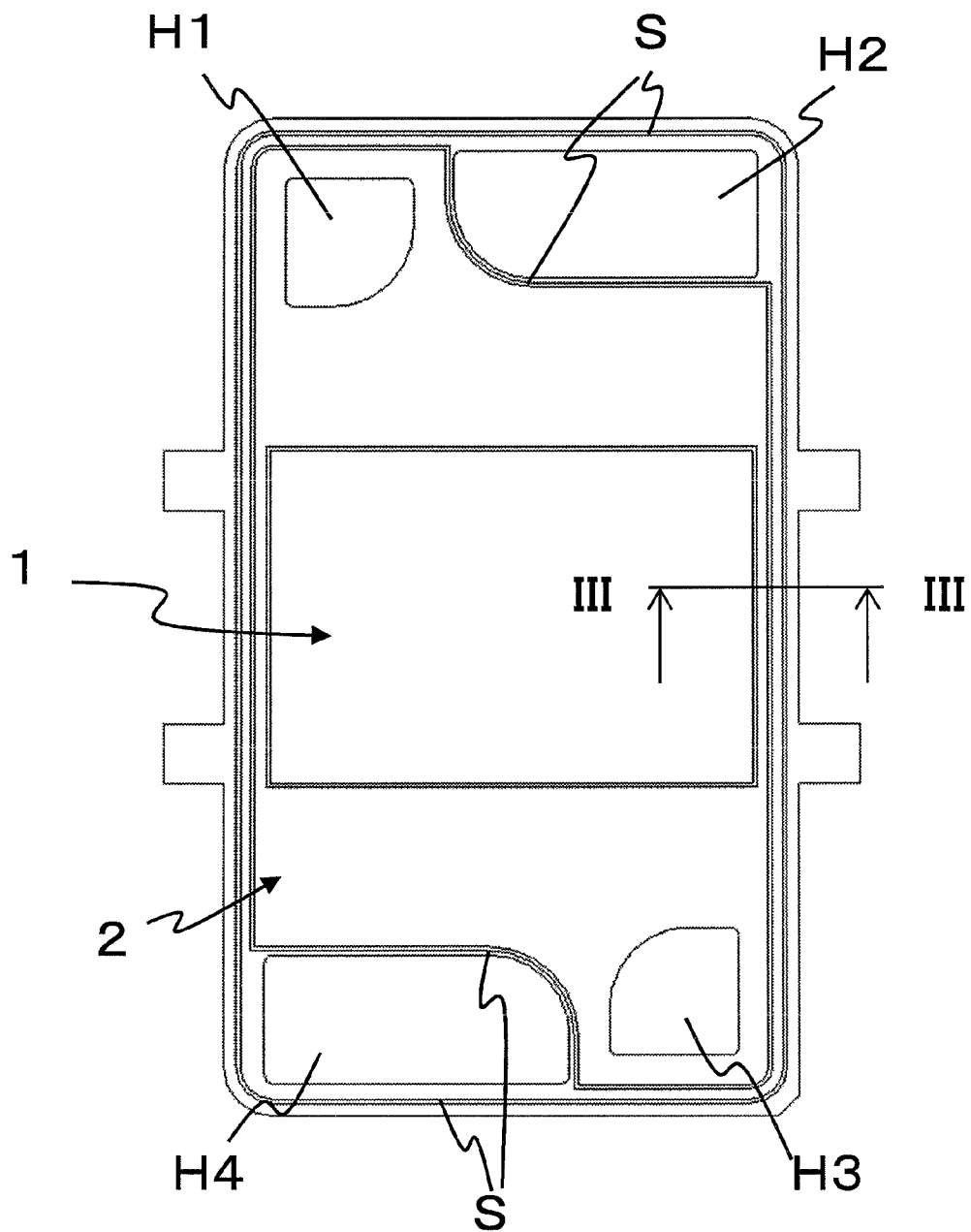
FIG. 2 is a plan view of a fuel cell.

First describes in details of a fuel cell according to a first embodiment, with reference to the drawings. FIG. 1 is an explosive perspective view of a fuel cell for illustrating the first embodiment. FIG. 2 is a plan view of a fuel cell. In FIG. 2, no separators are shown.

As shown in FIG. 1, the fuel cell FC of the present embodiment includes a cell structure 1, a metallic supporting plate 2 that supports the cell structure 1, and a pair of separators 3, 3 forming a gas channel between the separator and the cell structure 1 that is supported by the supporting plate 2. This fuel cell FC is a preferable embodiment whose mechanical strength is improved while maintaining the gas permeability with the metallic supporting plate 2, and is also referred to as a metal-supported cell. Suitable examples of the fuel cell include solid oxide fuel cell. However, the fuel cell is not particularly limited.

Further, as shown in FIG. 1, in the fuel cell FC of the present embodiment, the supporting plate 2 including the cell structure 1 and the pair of separators 3, 3 have preferably rectangular shapes with the same length and width dimensions.

Moreover, as shown in FIG. 1, the fuel cell FC of the present invention preferably has a gas channel between one of the separators 3 and a cathode electrode layer of the cell structure 1 (later described in details), which gas channel enables distribution of cathode gas (air). Furthermore, as shown in FIGS. 1 and 2, the fuel cell FC of the present embodiment preferably has a gas channel between the other separator 3 and an anode electrode layer (later described in details) and the supporting plate 2 of the cell structure 1, which gas channel enables distribution of anode gas (fuel gas).

Furthermore, as shown in FIGS. 1 and 2, in the fuel cell FC of the present embodiment, it is preferable to have a manifold hole H1 for supplying anode gas and a manifold hole H2 for discharging cathode gas on one short sides of each of the supporting plate 2 and the pair of separators 3, 3. Moreover, as shown in FIGS. 1 and 2, in the fuel cell FC of the present embodiment, it is preferable to have a manifold hole H3 for discharging anode gas and a manifold hole H4 for supplying cathode gas on the other short sides of each of the supporting plate 2 and the pair of separators 3, 3.

When the cell structures 1 and the separators 3 are stacked to configure a fuel cell stack, the manifold holes H1 to H4 communicate with each other to form manifolds through which respective gases flow. Moreover, when configuring the fuel cell stack, the cell structures 1 adjacent in the stacking direction share one separator 3.

Furthermore, the fuel cell FC of the present embodiment preferably has sealing members S between outer peripheries of the supporting plate 2 and each of the separators 3, and around the manifold holes H1 to H4 (see FIGS. 1 and 2). This ensures the air tightness of the gas channel. As for the surroundings of the manifold holes H1 to H4, the sealing members S are either not disposed, or an open part is provided to a portion of the sealing member S (see FIGS. 1 and 2) to enable the relevant gas to be distributed to the respective gas channels.

The aforementioned fuel cell FC supplies anode gas to the anode electrode layer (later described in details) of the cell structure 1, and generates electric energy by electrochemical reaction at each of the electrode layers by supplying cathode gas to the cathode electrode layer (later described in details) of the cell structure 1. At this time, the anode electrode layer (later described in details) of the cell structure 1 is supplied with anode gas through a main body (later described in details) of the supporting plate 2.

Figure 3:
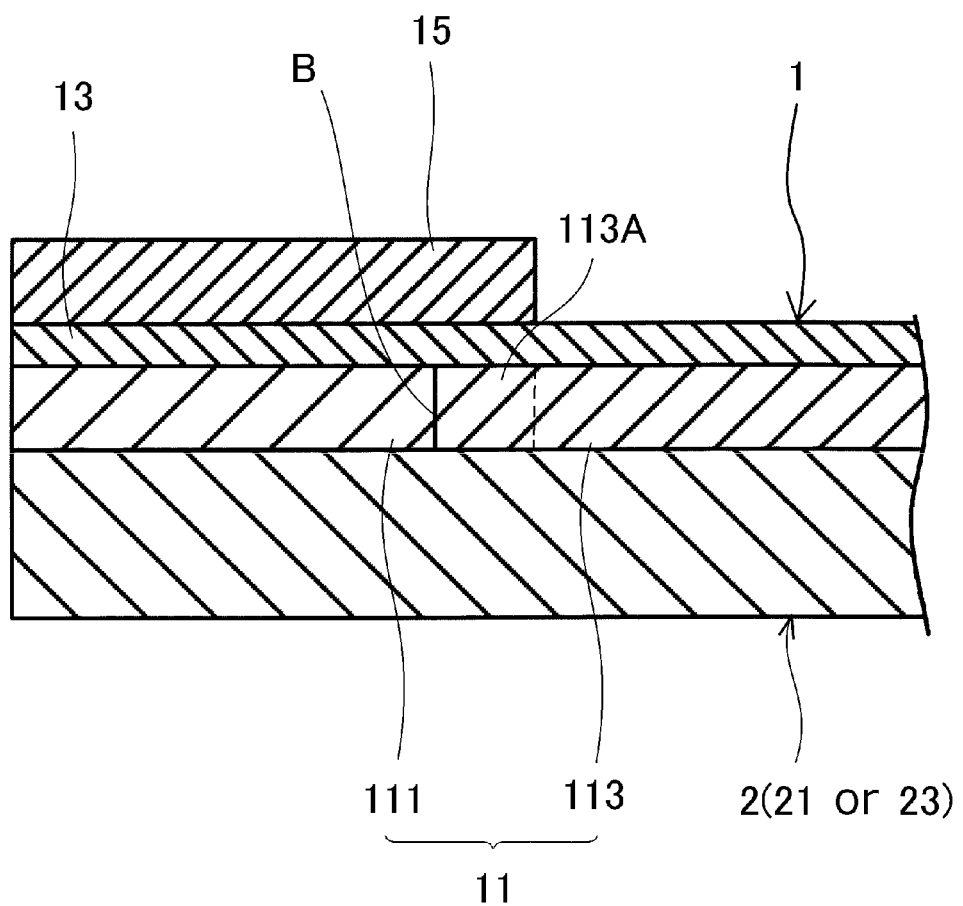
FIG. 3 is a cross-sectional view taken along line III-III of the example of the fuel cell shown in FIG. 2.

Next describes in details of a main part of a fuel cell according to the first embodiment of the present invention, with reference to the drawings. FIG. 3 is a cross-sectional view taken along line III-III an example of the fuel cell shown in FIG. 2.

As shown in FIG. 3, in the fuel cell FC of the present embodiment, the cell structure 1 has a configuration in which an anode electrode layer (fuel electrode layer) 11, an electrolyte layer 13 made of solid electrolyte, and a cathode electrode layer (air electrode layer) 15 are stacked in this order from the lower side in the drawing. The anode electrode layer 11 has an electrode reacting part 111 disposed in the middle and having a thermal expansion coefficient greater than a thermal expansion coefficient of the electrolyte layer, and an outer peripheral part 113 adjacent to the electrode reacting part 111 on the outer periphery of the electrode reacting part 111, and having a thermal expansion coefficient smaller than the thermal expansion coefficient of the electrode reacting part 111.

The "thermal expansion coefficient" in the present invention may employ an average linear thermal expansion coefficient measured by a method compliant to JIS Z 2285 and JIS R 1618, for example. Moreover, it is preferable to employ an average linear thermal expansion coefficient at an operating temperature of the fuel cell, for example. However, this is not particularly limited. Furthermore, the operating temperature of the fuel cell is around 600° C. to 900° C., for example. However, this is not particularly limited. Therefore, it is preferable to employ an average linear thermal expansion coefficient at 800° C. as the thermal expansion coefficient, for example. However, this is not particularly limited.

Moreover, as shown in FIG. 3, in the fuel cell FC of the present embodiment, the metallic supporting plate 2 reinforces the strength of the cell structure 1, and is also disposed on the anode electrode layer 11 side of the cell structure 1 to prevent oxidation of the supporting plate itself. However, this is not particularly limited. In the present invention, although not illustrated, if taking in mind just the purpose of the supporting plate to reinforce the strength of the cell structure, the supporting plate can be disposed on the cathode electrode layer side, for example. Moreover, although not illustrated, it is needless to say that the scope of the present invention encompasses a fuel cell including no supporting plate. Furthermore, the metallic supporting plate 2 at the illustrated position may be either of a main body 21 or a frame 23 later described in details. Moreover, the metallic supporting plate at the illustrated position may be a main body and a frame having a boundary (not illustrated) between the main body and the frame later described in details.

The present embodiment, as described above, is of a configuration including a cell structure having a configuration in which an anode electrode layer, an electrolyte layer, and a cathode electrode layer are stacked, wherein the anode electrode layer has an electrode reacting part arranged in the middle and having a thermal expansion coefficient is greater than the thermal expansion coefficient of the electrolyte layer, and an outer peripheral part arranged adjacent to the electrode reacting part on the outer periphery of the electrode reacting part and having a thermal expansion coefficient smaller than the thermal expansion coefficient of the electrode reacting part.

Therefore, it is possible to effectively restrain or prevent tensile break of the electrolyte layer that may occur along with the thermal expansion of the electrode reacting part, which electrode reacting part may relatively easily expand thermally, by arranging the outer peripheral part adjacent to the electrode reacting part, which outer peripheral part is relatively difficult to thermally expand, on the outer periphery of the electrode reacting part. As a result, it is possible to maintain a good gas barrier property in the fuel cell.

Moreover, the present embodiment, as described above, is preferably configured to further include a metallic supporting plate disposed on an anode electrode layer side of the cell structure, which metallic supporting plate supports the cell structure.

This allows for effectively restraining or preventing bending deformation of the electrolyte layer that may occur along with the thermal expansion of the electrode reacting part, as compared to a case of disposing a ceramic supporting plate. As a result, it is possible to maintain a good gas barrier property in the fuel cell.

Furthermore, the present embodiment, as described above, is preferably configured to have the outer peripheral part and the electrolyte layer, which are different from each other in either one or both of a constituent of its component(s) and a content ratio of the component(s).

This allows for appropriately selecting an outer peripheral part of various constituents and content ratios of the components. As a result, it is possible to maintain a good gas barrier property in the fuel cell.

Moreover, as shown in FIG. 3, the present embodiment preferably has a configuration in which a thickness of the outer peripheral part 113 is the same as a thickness of the electrode reacting part 111 at least in the vicinity of a boundary B between the outer peripheral part 113 and the electrode reacting part 111.

Here, the "vicinity of the boundary between the outer peripheral part and the electrode reacting part" may includes a range from the boundary between the outer peripheral part and the electrode reacting part to a position where the effect of thermal expansion of the electrode reacting part is almost ignorable. This range may be set as appropriate by preliminary experiment, for example.

Accordingly, when the surface of the supporting plate on the anode electrode layer side is flat for example, it is possible to provide a flat electrolyte layer particularly to a part where thermal stress difference easily generates. As a result, it is possible to maintain a good gas barrier property in the fuel cell. The configuration may be one in which the entire thickness of the outer peripheral part is the same as the thickness of the electrode reacting part.

Furthermore, as shown in FIG. 3, the present embodiment is preferably configured to have at least one part of an inner edge side of the outer peripheral part 113 having a structure, in which a flat surface is formed on the electrolyte layer 13 side together with the electrode reacting part 111. At least one part on the inner edge side of the outer peripheral part 113 may serve as the aforementioned vicinity of the boundary B between the outer peripheral part and the electrode reacting part, for example. Moreover, at least one part on the inner edge side of the outer peripheral part 113 is, for example, preferably a portion arranged in a way it overlaps with a portion of the cathode electrode layer in a plan view. Furthermore, at least one part on the inner edge side of the outer peripheral part 113 is, for example, preferably a portion arranged in a way it overlaps with a portion of the main body in a plan view. The entire outer peripheral part may have a configuration in which a flat surface is formed on the electrolyte layer side together with the electrode reacting part.

This allows for providing a flat electrolyte layer particularly to a part where thermal stress difference easily generates. As a result, it is possible to maintain a good gas barrier property in the fuel cell.

Moreover, in the present embodiment, the outer peripheral part and the electrode reacting part each include an anode catalyst and a solid electrolyte, and is preferably configured to have the content ratio of the anode catalyst of the outer peripheral part, which is less than the content ratio of the anode catalyst of the electrode reacting part.

This enables to produce an appropriate outer peripheral part by a simple manufacturing method or a simple material selection. This will be described in detail later. As a result, it is possible to maintain a good gas barrier property in the fuel cell. Moreover, there is also a secondary advantage that it is also possible to make the electrode reaction to proceed at the outer peripheral part.

Furthermore, as shown in FIG. 3, the present embodiment is preferably configured to have the outer peripheral part 113 which has a portion 113A arranged in a way it overlaps with the cathode electrode layer 15 in a plan view.

This causes the boundary between the members of the anode electrode layer and the boundary between the member of the cathode electrode layer and the space to shift off, thus allowing for restrain or preventing the concentration of stress caused by the thermal stress difference. As a result, it is possible to maintain a good gas barrier property in the fuel cell.

Moreover, this causes the boundary between the members of the anode electrode layer and the boundary between the member of the cathode electrode layer and the space to shift off, thus enabling to physically and effectively restrain or prevent the bending deformation of the electrolyte layer that may occur along with the thermal expansion of the electrode reacting part, as compared to a case of the outer peripheral part having no portion arranged in a way it overlaps with the cathode electrode layer in a plan view. As a result, it is possible to maintain a good gas barrier property in the fuel cell.

Hereinafter, each of the configurations will be individually described in more detail.

The constituent of the component of the electrode reacting part 111 in the anode electrode layer 11 is not particularly limited as long as the thermal expansion coefficient of the electrode reacting part is greater than the thermal expansion coefficient of the electrolyte layer. In a case in which the fuel cell is a solid oxide fuel cell, examples may include cermet made of nickel (Ni) and yttria-stabilized zirconia (YSZ). An average thermal expansion coefficient at 800° C. of cermet comprising nickel (Ni) and yttria-stabilized zirconia (YSZ) (Ni:YSZ=50:50 (mass ratio)) serving as one example of the electrode reacting part is $12.5 \times 10^{-6}$/K. Moreover, these are merely examples, and are also controllable by, for example, the forming methods.

Moreover, the constituent of the component of the outer peripheral part 113 in the anode electrode layer 11 is not particularly limited as long as the thermal expansion coefficient of the outer peripheral part is smaller than the thermal expansion coefficient of the electrode reacting part. That is, in the outer peripheral part, the electrode reaction may proceed, or the electrode process may not proceed, for example. Moreover, for example, it is preferable to employ an outer peripheral part with a constituent of the component(s) and content ratio of the component(s) different from the electrolyte layer described later. Furthermore, in a case in which the outer peripheral part contains the same anode catalyst and solid electrolyte as the electrode reacting part, a suitable example thereof may include an outer peripheral part having a content ratio of the anode catalyst smaller than the content ratio of the anode catalyst of the electrode reacting part. More specifically, in the case in which the outer peripheral part is a cermet made of nickel and yttria stabilized zirconia, a suitable example of the outer peripheral part includes one whose nickel content ratio is less than the nickel content ratio of the electrode reacting part. The average thermal expansion coefficient at 800° C. of cermet made of nickel (Ni) and yttria-stabilized zirconia (YSZ) (Ni:YSZ 20:80 (mass ratio)) serving as one example of the outer peripheral part is $11.0 \times 10^{-6}$/K. Moreover, these are merely examples, and are controllable by the forming method.

Furthermore, the constituent of the component(s) of the electrolyte layer 13 is not particularly limited, however, examples thereof include a solid electrolyte such as 8 mol % yttria-stabilized zirconia (8 mol % YSZ). The average thermal expansion coefficient at 800° C. of yttria-stabilized zirconia (YSZ) serving as one example of the electrolyte layer is $10.0 \times 10^{-6}$/K. Moreover, these are merely examples, and are controllable by the forming method. In the case in which the fuel cell is a solid oxide fuel cell, the constituent of the component(s) of the electrolyte layer preferably has oxide ion conductivity. Furthermore, although not illustrated, the electrolyte layer preferably covers the entire anode electrode layer.

Moreover, the constituent of the component(s) of the cathode electrode layer 15 is not particularly limited. However, in the case in which the fuel cell is a solid oxide fuel cell, examples include lanthanum strontium cobalt ferrite (LSCF).

Although not illustrated, in a case in which yttria-stabilized zirconium (YSZ) is employed as the electrolyte layer and lanthanum strontium cobalt ferrite (LSCF) is employed as the cathode electrode layer, it is preferable to provide a dispersion prevention layer containing ceria-based oxide between the electrolyte layer and the cathode electrode layer.

The metallic supporting plate 2 is not particularly limited. For example, it is possible to employ a porous metallic member such as a sintered metal body or a metal foam body.

Moreover, the metallic supporting plate is not particularly limited. A preferable example includes a metallic supporting plate made of a porous metallic member such as a sintered metal body or a metal foam body, whose frame (later described in detail) is, for example, crushed in a thickness direction at a portion of the porous metallic member by press working to form it dense.

Moreover, the metallic supporting plate is not particularly limited. However, a preferable example includes one whose surface on the anode electrode layer side is flat.

Figure 4:
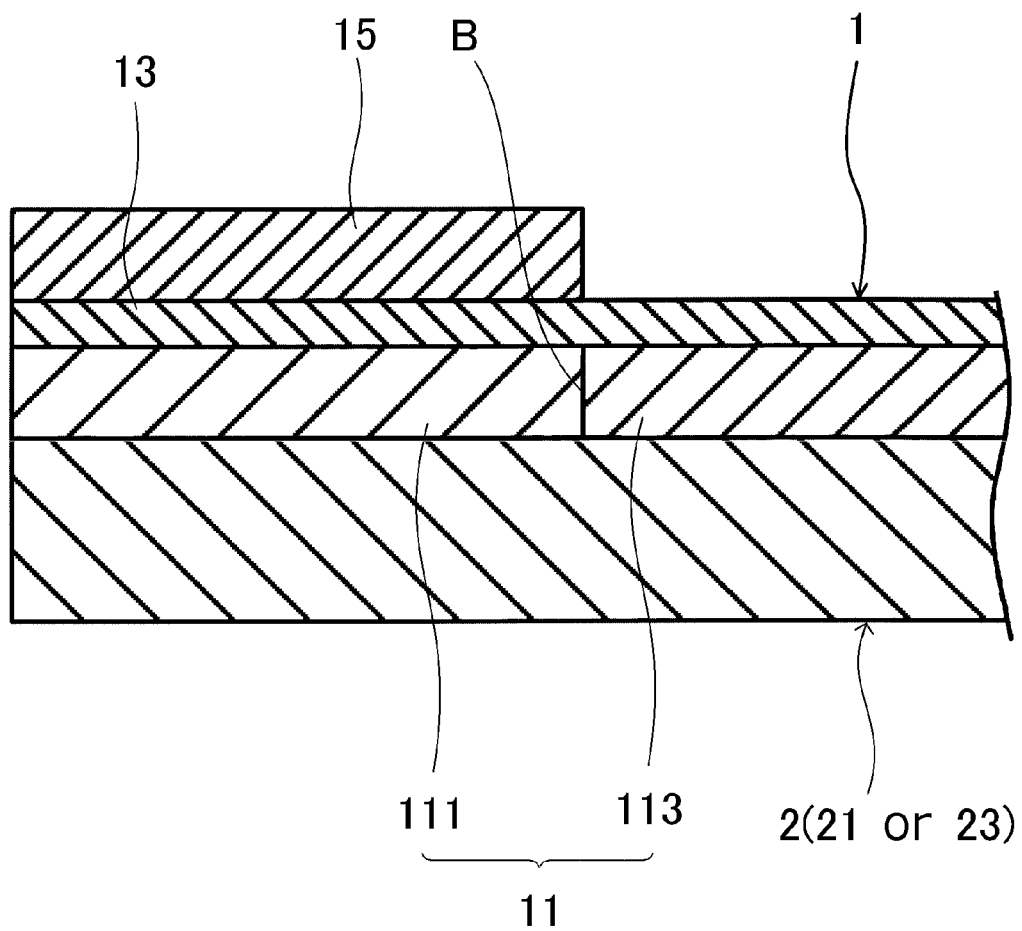
FIG. 4 is a cross-sectional view of a main part of a first modification of a fuel cell for illustrating the first embodiment.
Figure 5:
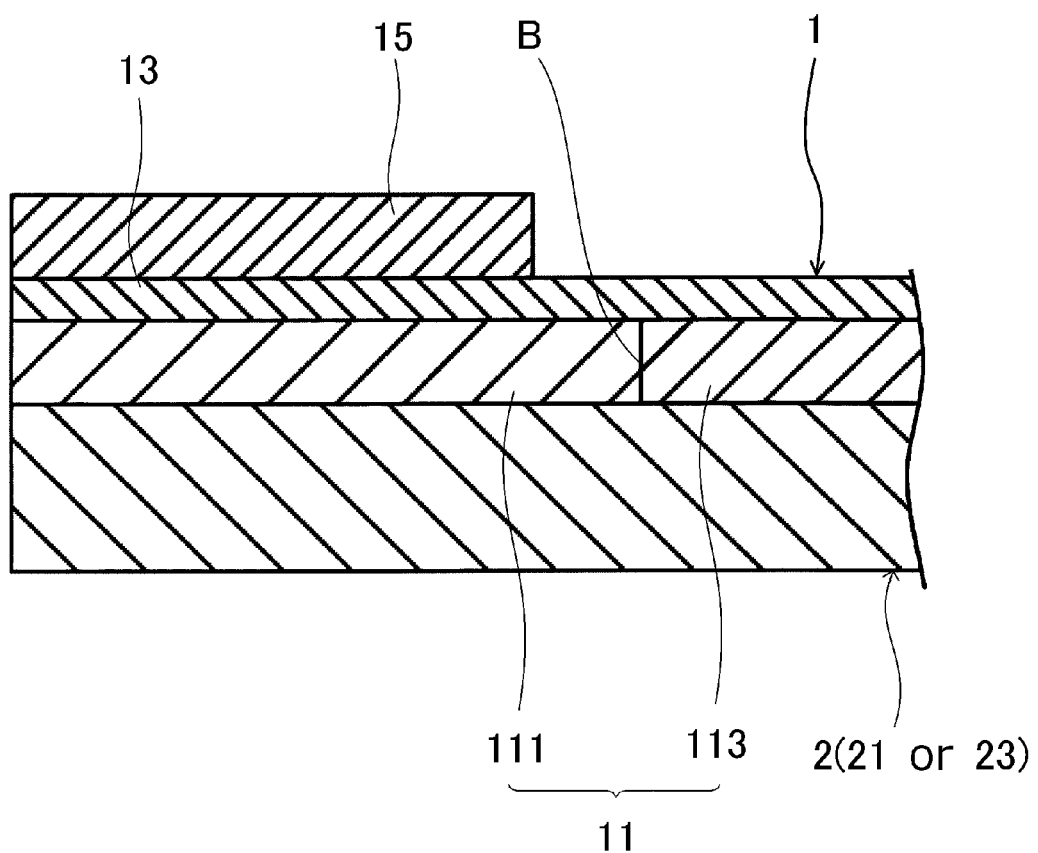
FIG. 5 is a cross-sectional view of a main part of a second modification of the fuel cell for illustrating the first embodiment.

Next describes in details of modifications of the fuel cell according to the first embodiment, with reference to the drawings. FIG. 4 is a cross-sectional view of a main part of a first modification of the fuel cell for illustrating the first embodiment. FIG. 5 is a cross-sectional view of a main part of a second modification of the fuel cell for illustrating the first embodiment. In the following modifications, the same reference signs are denoted to the same components as those of the example of the first embodiment, and detailed descriptions are omitted.

The first modification shown in FIG. 4 and the second modification shown in FIG. 5 differ from the example shown in FIG. 3 in the position of the boundary B between the outer peripheral part 113 and the electrode reacting part 111. Namely, in the first modification shown in FIG. 4, an outer edge of the cathode electrode layer 15 is arranged in a way it overlaps with the boundary B in a plan view. In the second modification shown in FIG. 5, the boundary B is arranged on the outer side of the outer edge of the cathode electrode layer 15 in a plan view.

As described above, in terms of restraining the concentration of stress caused by thermal stress difference, the example shown in FIG. 3 and the second modification shown in FIG. 5 are more suitable than the first modification shown in FIG. 4. Moreover, as described above, in terms of restraining the bending deformation of the electrolyte layer that may occur along with the thermal expansion of the electrode reacting part, the example shown in FIG. 3 is more suitable than the second modification shown in FIG. 5.

Second Embodiment

Figure 6:
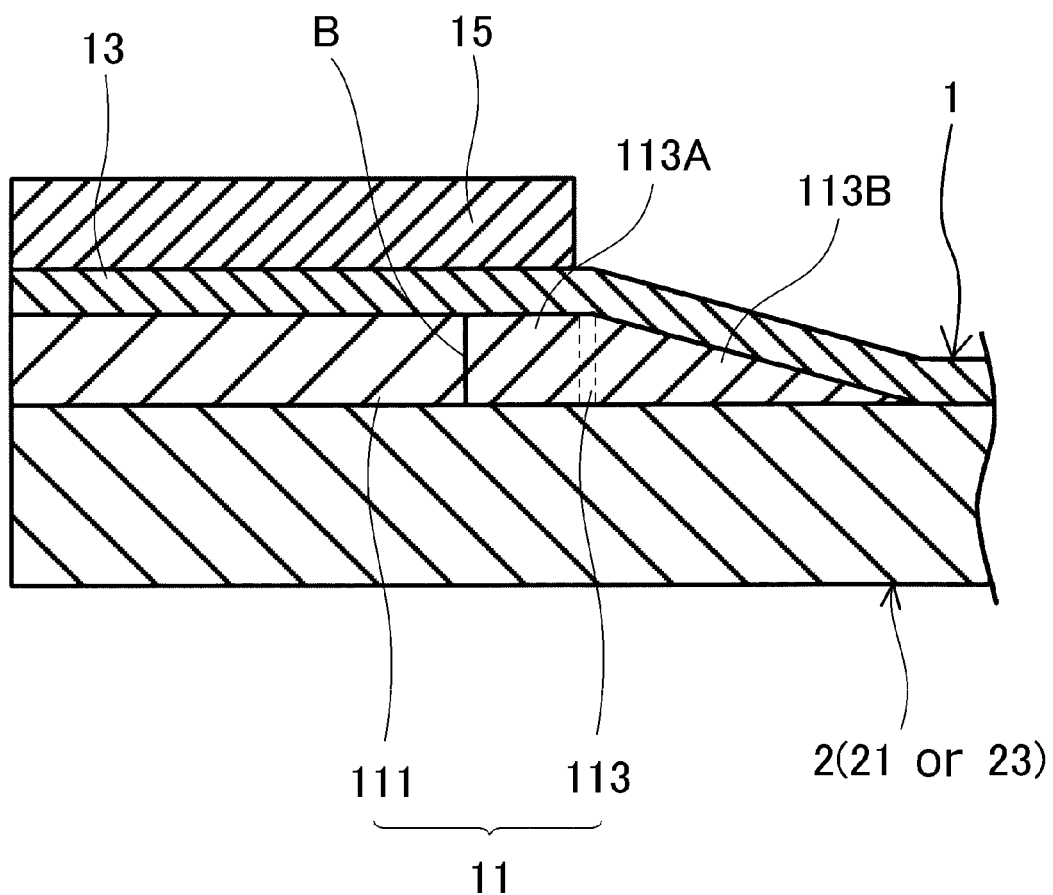
FIG. 6 is a cross-sectional view of a main part of one example of a fuel cell for illustrating a second embodiment.

Next describes in details of a fuel cell according to a second embodiment, with reference to the drawings. FIG. 6 is a cross-sectional view of a main part of an example of a fuel cell for illustrating the second embodiment. Namely, FIG. 6 is a cross-sectional view of substantially the same position as the position taken along the line III-III of the fuel cell shown in FIG. 2. In the following embodiment, the same reference signs are denoted to the same components as those of the first embodiment, and the detailed descriptions are omitted.

As shown in FIG. 6, the fuel cell of the present embodiment differs from the aforementioned embodiment in a configuration which the outer peripheral part 113 has a portion 113B being gradually reduced in thickness towards the outer edge side.

Accordingly, no part, where a direction on which stress is applied significantly changes in a narrow range such as a level difference, is formed in the electrolyte layer. As a result, it is possible to maintain a good gas barrier property in the fuel cell.

Moreover, in the present embodiment also, as described above, it is preferable to have a configuration further including a metallic supporting plate disposed on the anode electrode layer side of the cell structure, which supporting plate supports the cell structure.

This enables for effectively restraining or preventing bending deformation of the electrolyte layer that may occur along with the thermal expansion of the electrode reacting part, as compared to a case of disposing a ceramic supporting plate. As a result, it is possible to maintain a good gas barrier property in the fuel cell.

Furthermore, the present embodiment is also preferably configured to have the outer peripheral part and the electrolyte layer, which are different from each other in either one or both of a constituent of a component(s) and a content ratio of the component(s), as described above.

This allows for selecting an outer peripheral part of various constituents and content ratios of the components. As a result, it is possible to maintain a good gas barrier property in the fuel cell.

Moreover, as shown in FIG. 6, it is preferable for the present embodiment also to have a configuration in which the thickness of the outer peripheral part 113 is the same as the thickness of the electrode reacting part 111 at least in the vicinity of the boundary B between the outer peripheral part 113 and the electrode reacting part 111.

Accordingly, for example when the surface of the supporting plate on the anode electrode layer side is flat, it is possible to provide a flat electrolyte layer particularly to a part where thermal stress difference easily generates. As a result, it is possible to maintain a good gas barrier property in the fuel cell.

Furthermore, as shown in FIG. 6, the present embodiment is preferably also configured to have at least one part of an inner edge side of the outer peripheral part 113 having a structure, in which a flat surface is formed on the electrolyte layer 13 side together with the electrode reacting part 111. The at least one portion on the inner edge side of the outer peripheral part 113 may serve as the aforementioned vicinity of the boundary B between the outer peripheral part and the electrode reacting part, for example. Moreover, the at least one portion on the inner edge side of the outer peripheral part 113 is, for example, preferably a portion arranged in a way it overlaps with a portion of the cathode electrode layer in a plan view. Furthermore, the at least one portion on the inner edge side of the outer peripheral part 113 is, for example, preferably a portion arranged in a way it overlaps with a portion of the main body in a plan view.

Accordingly, it is possible to provide a flat electrolyte layer particularly to a part where thermal stress difference easily generates. As a result, it is possible to maintain a good gas barrier property in the fuel cell.

Moreover, in the present embodiment also, the outer peripheral part and the electrode reacting part each contain an anode catalyst and a solid electrolyte, and are preferably configured to have the content ratio of the anode catalyst of the outer peripheral part, which is less than the content ratio of the anode catalyst of the electrode reacting part.

This enables to produce an appropriate outer peripheral part by a simple manufacturing method or a simple material selection. This will be described in detail later. As a result, it is possible to maintain a good gas barrier property in the fuel cell. Moreover, there is also a secondary advantage that it is also possible to make the electrode reaction to proceed at the outer peripheral part.

Furthermore, as shown in FIG. 6, the present embodiment is also preferably configured to have the outer peripheral part 113 having a portion 113A arranged in a way it overlaps with the cathode electrode layer 15 in a plan view.

This causes the boundary between the members of the anode electrode layer and the boundary between the member of the cathode electrode layer and the space to shift off, thus enabling to restrain or prevent the concentration of stress caused by the thermal stress difference. As a result, it is possible to maintain a good gas barrier property in the fuel cell.

Moreover, this causes the boundary between the members of the anode electrode layer and the boundary between the member of the cathode electrode layer and the space to shift off, thus physically and effectively restraining or preventing the bending deformation of the electrolyte layer that may occur along with the thermal expansion of the electrode reacting part, as compared to a case in which the outer peripheral part has no part arranged in a way it overlaps with the cathode electrode layer in a plan view. As a result, it is possible to maintain a good gas barrier property in the fuel cell.

Figure 7:
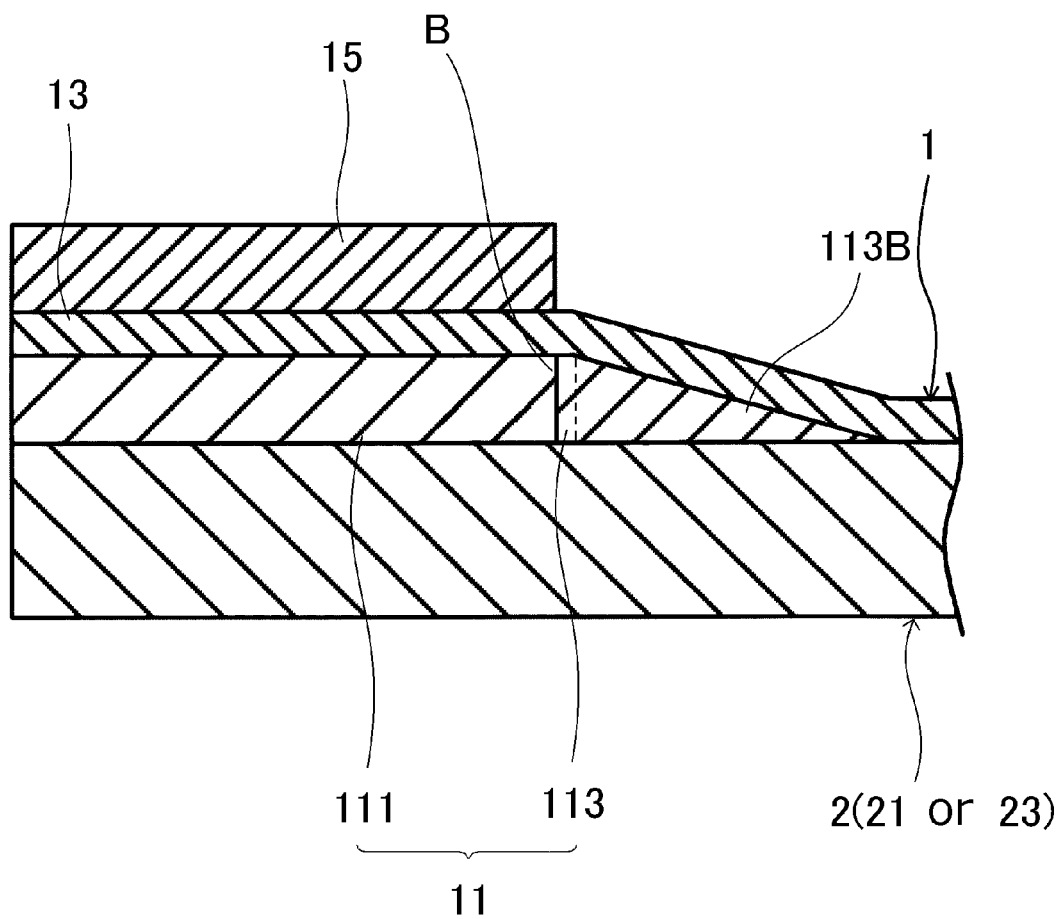
FIG. 7 is a cross-sectional view of a main part of a first modification of the fuel cell for illustrating the second embodiment.
Figure 8:
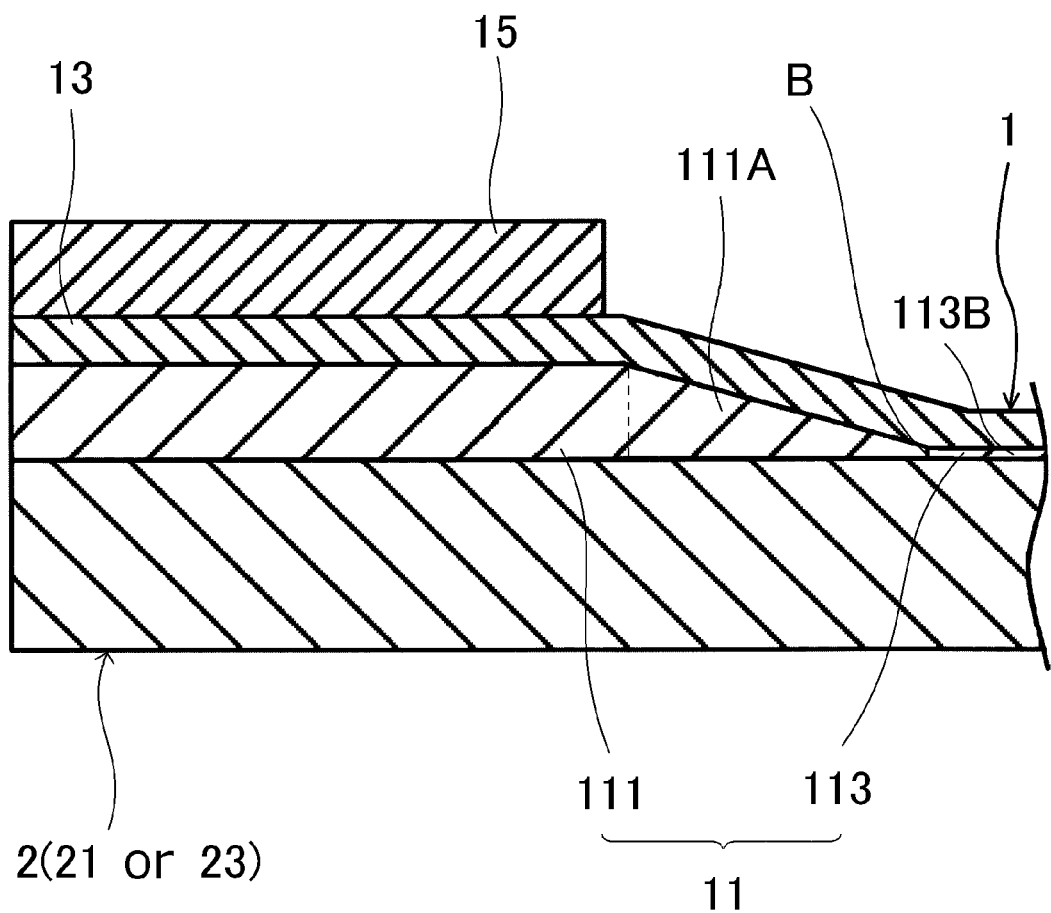
FIG. 8 is a cross-sectional view of a main part of a second modification of the fuel cell for illustrating the second embodiment.

Next describes in details of a modification of a fuel cell according to the second embodiment, with reference to the drawings. FIG. 7 is a cross-sectional view of a main part of a first modification of a fuel cell for illustrating the second embodiment. FIG. 8 is a cross-sectional view of a main part of a second modification of the fuel cell for illustrating the second embodiment.

The first modification shown in FIG. 7 and the second modification shown in FIG. 8 differ from the example shown in FIG. 6 in the position of the boundary B between the outer peripheral part 113 and the electrode reacting part 111. Namely, in the first modification shown in FIG. 7, the outer edge of the cathode electrode layer 15 is arranged in a way it overlaps with the boundary B in a plan view. In the second modification shown in FIG. 8, the boundary B is arranged on the outer side of the outer edge of the cathode electrode layer 15 in a plan view. Furthermore, in the second modification shown in FIG. 8, the portion 113B of the outer peripheral part, whose thickness is gradually reduced towards the outer edge side, in the example shown in FIG. 6 is replaced with a portion 111A of the electrode reacting part 111, whose thickness is gradually reduced towards the outer edge side and whose tip is positioned on the supporting plate 2 side (described later in detail), and the portion 113B of the outer peripheral part is arranged on an outer side thereof. Although not illustrated, the thickness of the outer peripheral part 113 in the second modification may not be necessarily reduced towards the outer edge gradually.

As described above, in terms of restraining the concentration of stress caused by thermal stress difference, the example shown in FIG. 6 and the second modification shown in FIG. 8 are more suitable than the first modification shown in FIG. 7. Moreover, as described above, in terms of restraining the bending deformation of the electrolyte layer that may occur along with the thermal expansion of the electrode reacting part, the example shown in FIG. 6 is more suitable than the second modification shown in FIG. 8.

Third Embodiment

Figure 9:
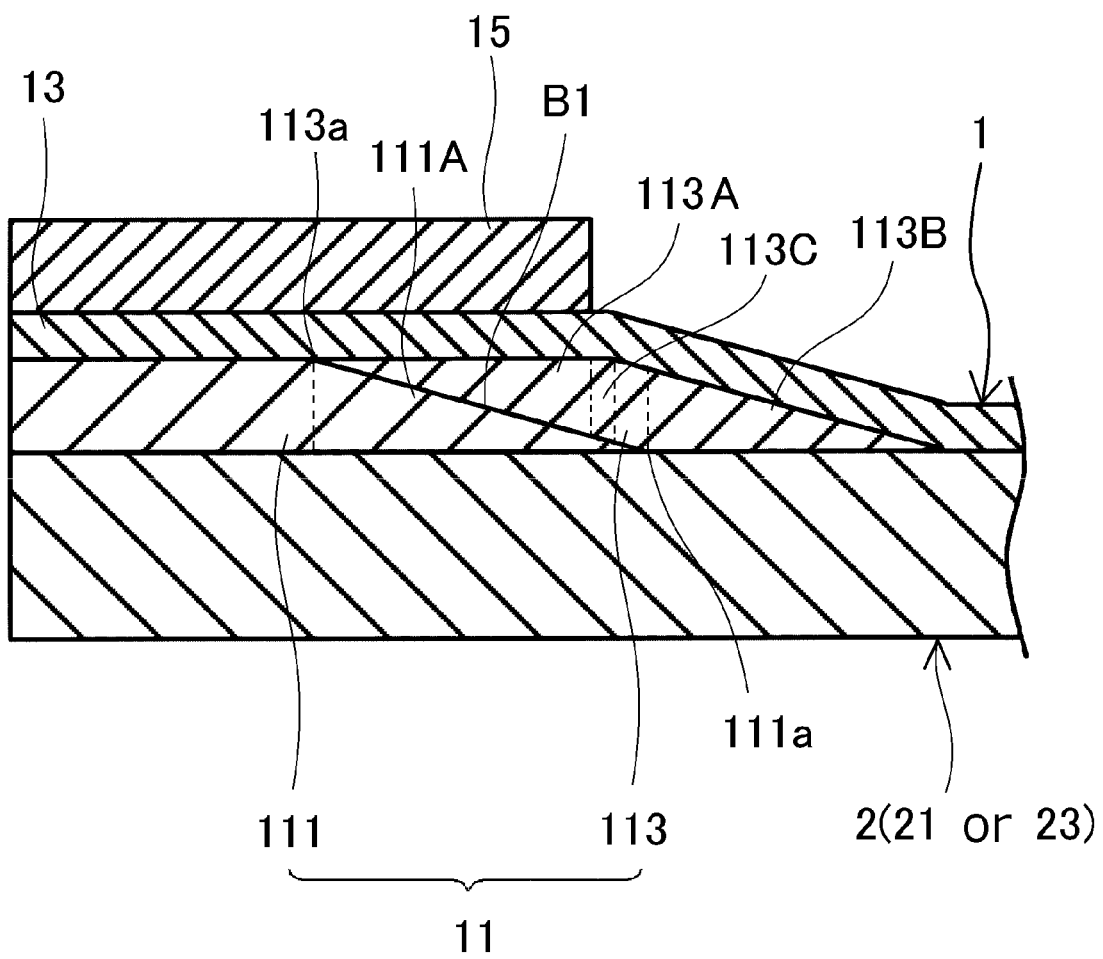
FIG. 9 is a cross-sectional view of a main part of an example of a fuel cell for illustrating a third embodiment.

Next describes in details of a fuel cell according to a third embodiment of the present invention, with reference to the drawings. FIG. 9 is a cross-sectional view of a main part of an example of a fuel cell for illustrating the third embodiment. Namely, FIG. 9 is a cross-sectional view of substantially the same position as the position taken along line III-III of the fuel cell shown in FIG. 2.

As shown in FIG. 9, the fuel cell of the present embodiment differs from the aforementioned embodiment in a configuration in which the thickness of the outer peripheral part 113 is gradually reduced towards its inner edge side and the outer peripheral part 113 has a portion 113C in which a tip 113*a* is disposed on an electrolyte layer 13 side, and the thickness of the electrode reacting part 111 is gradually reduced towards its outer edge side and the electrode reacting part 111 has a portion 111A in which a tip 111*a* is disposed on a side opposite of the electrolyte layer 13, in other words on the supporting plate 2 side. The boundary B1 between the outer peripheral part 113 and the electrode reacting part 113 is inclined against the thickness direction of the anode electrode layer 11.

By having the outer peripheral part being difficult to relatively thermally expand be positioned on the electrolyte layer side, the thermal expansion on the electrolyte side is restrained or prevented. As a result, it is possible to maintain a good gas barrier property in the fuel cell. Moreover, by having the electrode reacting part that thermally expands relatively easily be positioned on the supporting plate side for example, the thermal expansion difference between the supporting plate and the anode electrode layer will be reduced, and microscopic release is restrained or prevented. As a result, it is possible to maintain a good gas barrier property in the fuel cell.

Moreover, in the present embodiment also, as described above, it is preferable to have a configuration further including a metallic supporting plate arranged on the anode electrode layer side of the cell structure, which supporting plate supports the cell structure.

This makes it possible to effectively restrain or prevent bending deformation of the electrolyte layer that may occur along with the thermal expansion of the electrode reacting part, as compared to a case of disposing a ceramic supporting plate. As a result, it is possible to maintain a good gas barrier property in the fuel cell.

Furthermore, the present embodiment is also preferably configured to have the outer peripheral part and the electrolyte layer, which are different from each other be in either one or both of the constituent of the component(s) and the content ratio of the component(s), as described above.

This allows for appropriately selecting an outer peripheral part of various constituents and content ratio of the component(s). As a result, it is possible to maintain a good gas barrier property in the fuel cell.

Moreover, as shown in FIG. 9, it is also preferable for the present embodiment to have a configuration in which at least one part of the inner edge side of the outer peripheral part 113 has a structure, in which a flat surface is formed on the electrolyte layer 13 side together with the electrode reacting part 111.

Accordingly, it is possible to provide a flat electrolyte layer particularly to a part where thermal stress difference easily generates. As a result, it is possible to maintain a good gas barrier property in the fuel cell.

Furthermore, in the present embodiment also, the outer peripheral part and the electrode reacting part each include an anode catalyst and a solid electrolyte, and are preferably configured to have the content ratio of the anode catalyst of the outer peripheral part, which is less than the content ratio of the anode catalyst of the electrode reacting part.

This enables to provide an appropriate outer peripheral part by a simple manufacturing method or a simple material selection. This will be described in detail later. As a result, it is possible to maintain a good gas barrier property in the fuel cell. Moreover, there is also a secondary advantage that it is also possible to make the electrode reaction to proceed at the outer peripheral part.

Moreover, as shown in FIG. 9, the present embodiment is also preferably configured to have the outer peripheral part 113 having a portion 113A arranged in a way it overlaps with the cathode electrode layer 15 in a plan view.

This causes the boundary between the members of the anode electrode layer and the boundary between the member of the cathode electrode layer and the space to shift off, thus enabling to restrain or prevent the concentration of stress by the thermal stress difference. As a result, it is possible to maintain a good gas barrier property in the fuel cell.

Moreover, this causes the boundary between the members of the anode electrode layer and the boundary between the member of the cathode electrode layer and the space to shift off, thus physically and effectively restrain or prevent the bending deformation of the electrolyte layer that may occur along with the thermal expansion of the electrode reacting part, as compared to a case in which the outer peripheral part has no part arranged in a way it overlaps with the cathode electrode layer in a plan view. As a result, it is possible to maintain a good gas barrier property in the fuel cell.

Furthermore, as shown in FIG. 9, in the present embodiment also, it is preferable to have a configuration in which the outer peripheral part 113 has a portion 113B, whose thickness is gradually reduced towards the outer end side.

Accordingly, no part, where a direction on which stress is applied significantly changes in a narrow range such as a level difference, is formed in the electrolyte layer. As a result, it is possible to maintain a good gas barrier property in the fuel cell.

Figure 10:
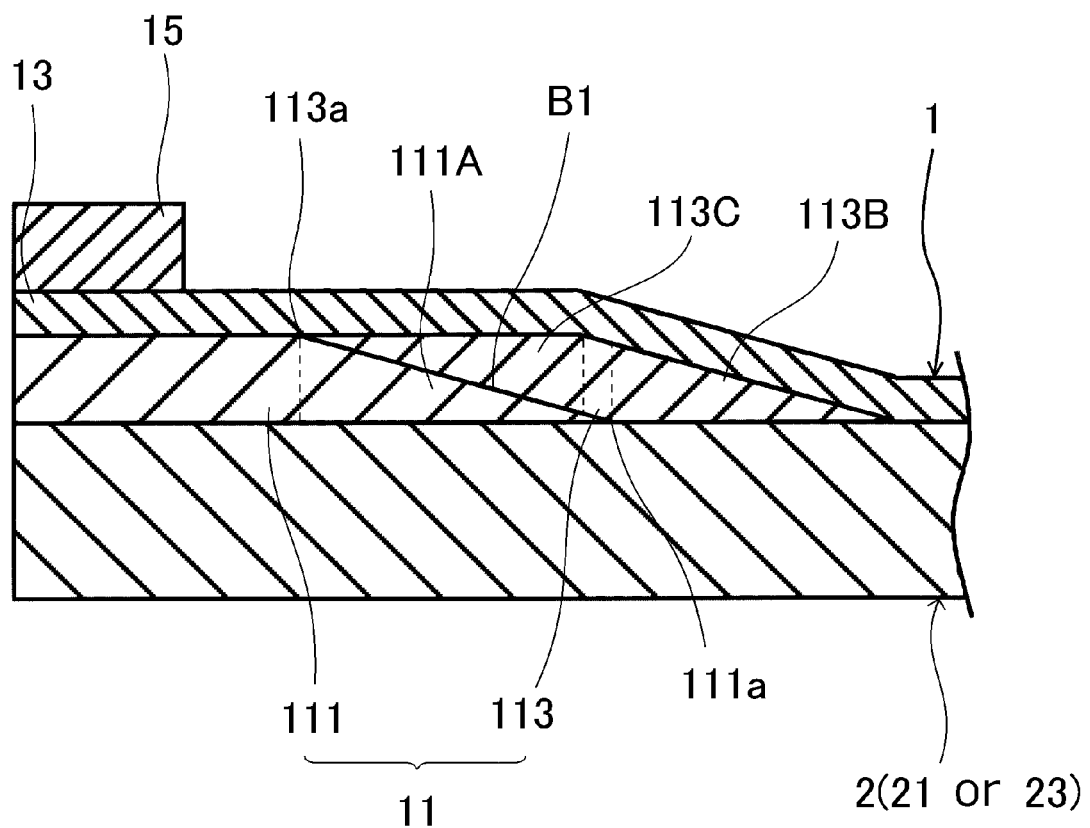
FIG. 10 is a cross-sectional view of a main part of a first modification of the fuel cell for illustrating the third embodiment.
Figure 11:
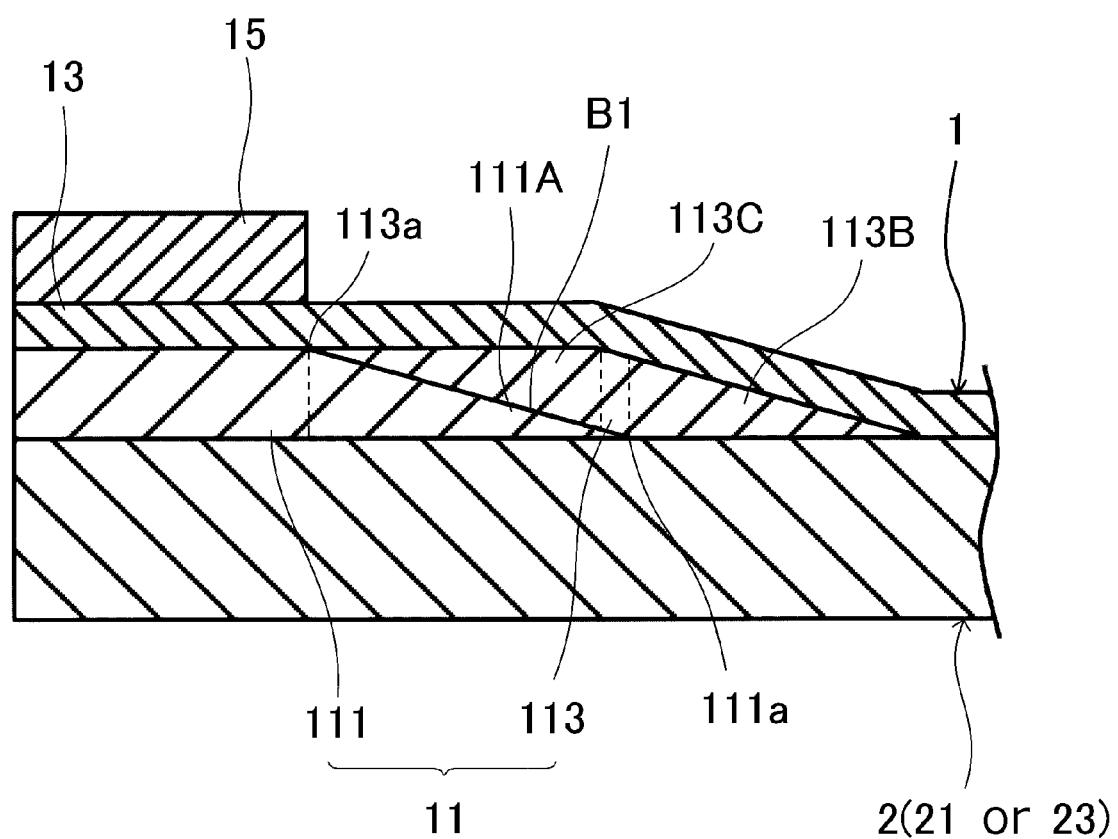
FIG. 11 is a cross-sectional view of a main part of a second modification of the fuel cell for illustrating the third embodiment.
Figure 12:
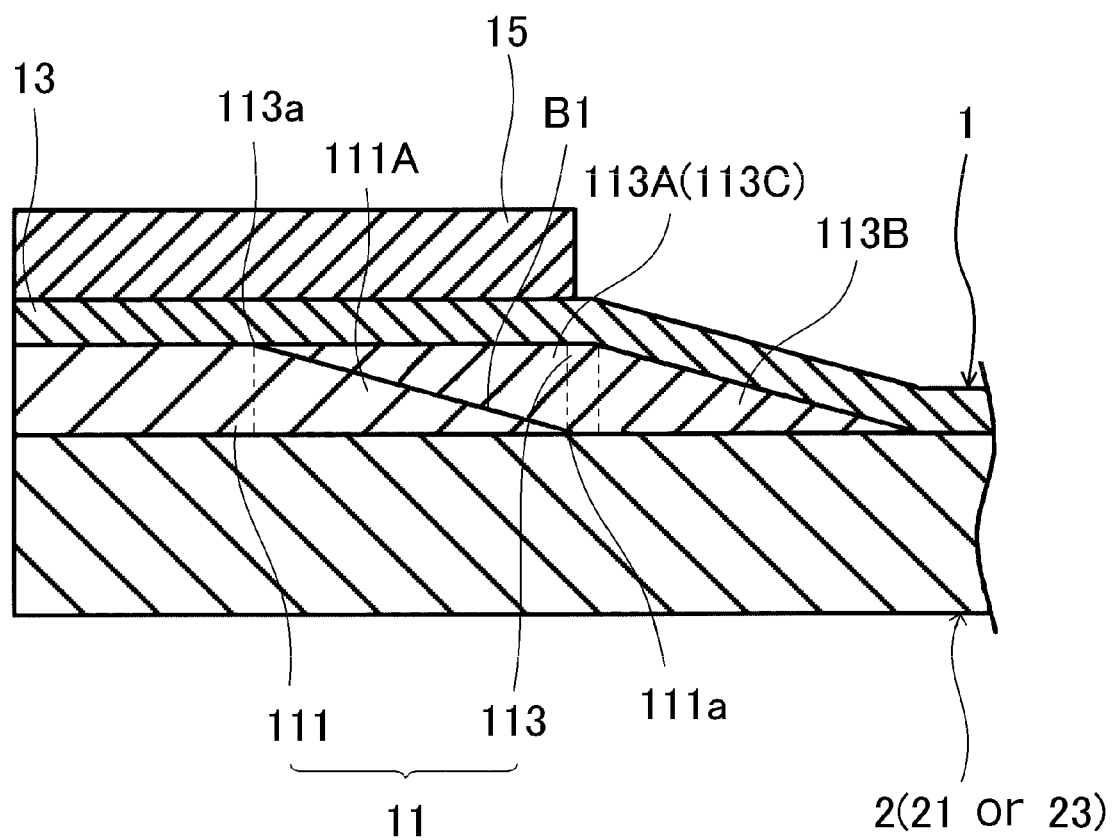
FIG. 12 is a cross-sectional view of a main part of a third modification of the fuel cell for illustrating the third embodiment.
Figure 13:
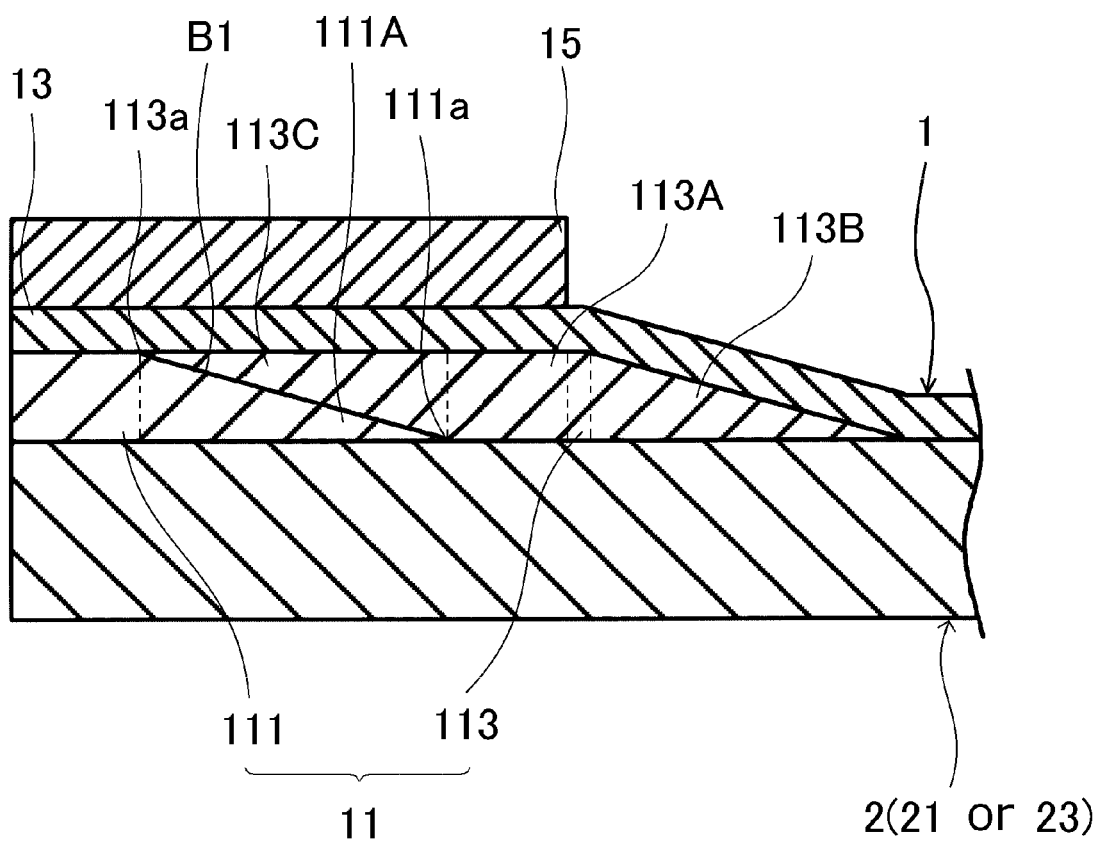
FIG. 13 is a cross-sectional view of a main part of a fourth modification of the fuel cell for illustrating the third embodiment.

Next describes in details of a modification of a fuel cell according to a third embodiment, with reference to the drawings. FIG. 10 is a cross-sectional view of a main part of a first modification of a fuel cell for illustrating the third embodiment. FIG. 11 is a cross-sectional view of a main part of a second modification of the fuel cell for illustrating the third embodiment. FIG. 12 is a cross-sectional view of a main part of a third modification of the fuel cell for illustrating the third embodiment. FIG. 13 is a cross-sectional view of a main part of a fourth modification of the fuel cell for illustrating the third embodiment.

The first modification shown in FIG. 10 to the fourth modification shown in FIG. 13 differ from the example shown in FIG. 9 in a position of the boundary B1 between the outer peripheral part 113 and the electrode reacting part 111. Namely, in the first modification shown in FIG. 10, the outer edge of the cathode electrode layer 15 is arranged on the inner side of the tip 113a inside of the outer peripheral part 113 in a plan view. Moreover, in the second modification shown in FIG. 11, the outer edge of the cathode electrode layer 15 is arranged in a way it overlaps with the tip 113a inside of the outer peripheral part 113 in a plan view. Furthermore, in the third modification shown in FIG. 12, the outer edge of the cathode electrode layer 15 is arranged in a way it overlaps with the tip 11a outside of the electrode reacting part 111 in a plan view. Furthermore, in the fourth modification shown in FIG. 13, the outer edge of the cathode electrode layer 15 is arranged on the outer side of the tip 111a outside of the electrode reacting part 111 in a plan view.

As described above, in terms of restraining the bending deformation of the electrolyte layer that may occur along with the thermal expansion of the electrode reacting part, it is considered that the example shown in FIG. 9, the third modification shown in FIG. 12, and the fourth modification shown in FIG. 13 are more suitable than the first modification shown in FIG. 10 and the second modification shown in FIG. 11. Moreover, in terms of restraining the concentration of stress caused by thermal stress difference, it is considered that the example shown in FIG. 9 and the fourth modification shown in FIG. 13 are more suitable than the third modification shown in FIG. 12. It is preferable to select between the example shown in FIG. 9 and the fourth modification shown in FIG. 13 by the difference in constituent material of the anode electrode layer, as appropriate.

Fourth Embodiment

Figure 14:
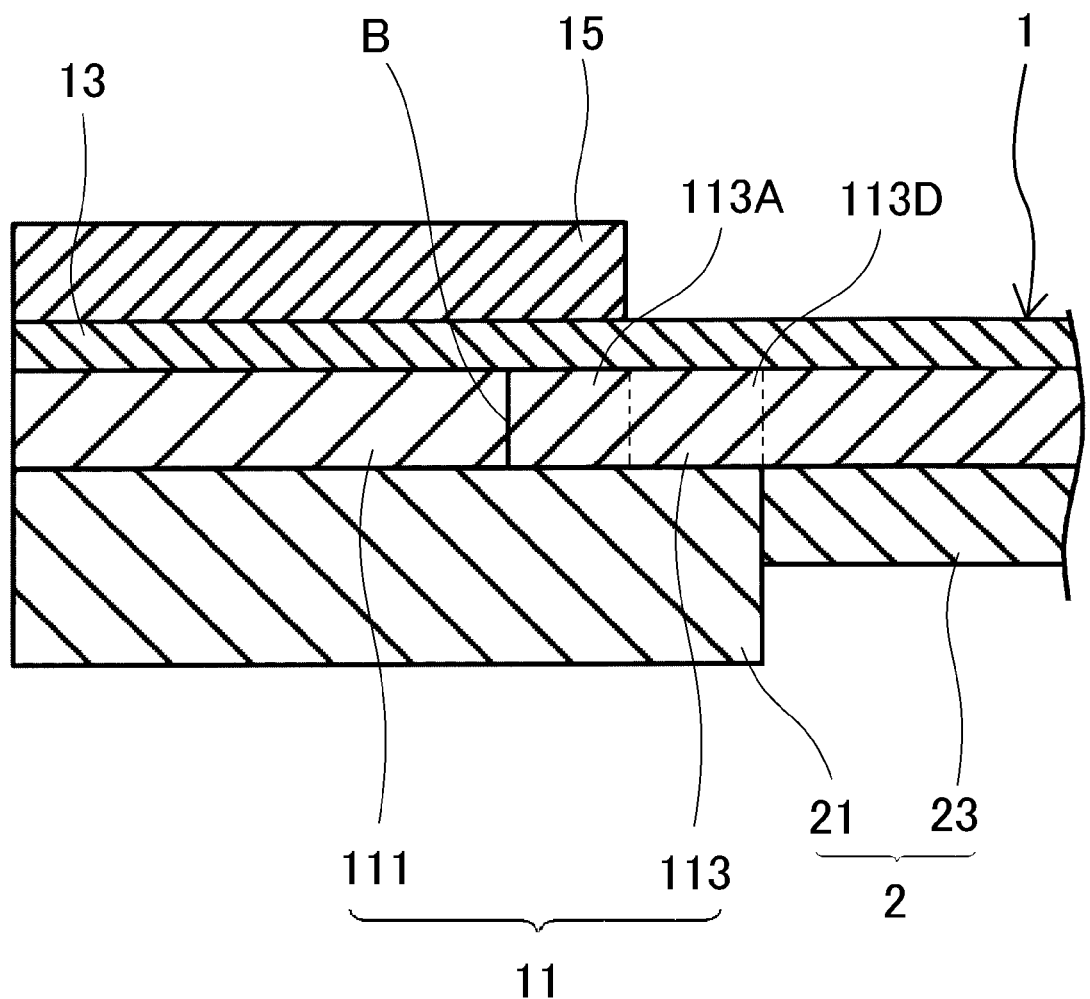
FIG. 14 is a cross-sectional view of a main part of an example of a fuel cell for illustrating a fourth embodiment.

Next describes in details of a fuel cell according to a fourth embodiment, with reference to the drawings. FIG. 14 is a cross-sectional view of a main part of one example of a fuel cell for illustrating the fourth embodiment. Namely, FIG. 14 is a cross-sectional view of substantially the same position as the position taken along line III-III of the fuel cell shown in FIG. 2.

As shown in FIG. 14, the fuel cell of the present embodiment differs from the aforementioned embodiment in a configuration in which the metal supporting plate 2 has a main body 21 in the center, the main body having gas permeability, and contacting with the electrode reacting part 111 of the anode electrode layer 11, and a frame 23, which is arranged on the outer periphery of the main body 21 and has gas non-permeability. In the metallic supporting plate 2 in the present embodiment, the thickness of the frame 23 is less than the thickness of the main body 21. Such a supporting plate is not particularly limited, however, for example, can be obtained by press forming a porous metal plate portion such as a sintered metal body or a metal foam body having a constant thickness, and by crushing the portion becoming the frame in the thickness direction to form it dense.

This allows for making use of the gas barrier property of the metal supporting plate itself. As a result, it is possible to maintain a good gas barrier property in the fuel cell. Moreover, as described above, it is possible to effectively restrain or prevent the bending deformation of the electrolyte layer that may occur along with the thermal expansion of the electrode reacting part, as compared to the case in which a ceramic supporting plate is disposed. As a result, it is possible to maintain a good gas barrier property in the fuel cell.

Moreover, as shown in FIG. 14, in the fuel cell of the present embodiment, it is preferable to have a configuration in which the outer peripheral part 113 has a portion 113D arranged in a way it overlaps with the main body 21 in a plan view.

This causes the boundary between the portions of the support shift off from the boundary between the members of the anode layer, thus enabling to restrain or prevent the concentration of stress caused by thermal stress difference. As a result, it is possible to maintain a good gas barrier property in the fuel cell.

Furthermore, the present embodiment is also preferably configured to have the outer peripheral part and the electrolyte layer, which are different from each other in either one or both of the constituent of the component(s) and the content ratio of the component(s), as described above.

This allows for appropriately selecting an outer peripheral part of various constituents and content ratio of the component(s). As a result, it is possible to maintain a good gas barrier property in the fuel cell.

Moreover, as shown in FIG. 14, it is also preferable for the present embodiment to have a configuration in which the thickness of the outer peripheral part 113 is the same as the thickness of the electrode reacting part 111 at least in the vicinity of the boundary B between the outer peripheral part 113 and the electrode reacting part 111.

Accordingly, for example when the surface of the supporting plate on the anode electrode layer side is flat, it is possible to provide a flat electrolyte layer particularly to a part where thermal stress difference easily generates. As a result, it is possible to maintain a good gas barrier property in the fuel cell.

Furthermore, as shown in FIG. 14, it is preferable for the present embodiment also to have a configuration in which at least one portion of the inner edge side of the outer peripheral part 113 has a structure, in which a flat surface is formed on the electrolyte layer 13 side together with the electrode reacting part 111. At least one portion on the inner edge side of the outer peripheral part 113 may serve as the aforementioned vicinity of the boundary B between the outer peripheral part and the electrode reacting part, for example. Moreover, at least one portion on the inner edge side of the outer peripheral part 113 is, for example, preferably a portion arranged in a way it overlaps with a portion of the cathode electrode layer in a plan view. Furthermore, at least one portion of the inner edge side of the outer peripheral part 113 is, for example, preferably a portion arranged in a way it overlaps with a portion of the main body in a plan view.

Accordingly, it is possible to provide a flat electrolyte layer particularly to a part where thermal stress difference easily generates. As a result, it is possible to maintain a good gas barrier property in the fuel cell.

Moreover, in the present embodiment also, the outer peripheral part and the electrode reacting part each include an anode catalyst and a solid electrolyte, and are preferably configured to have the content ratio of the anode catalyst of the outer peripheral part, which is less than the content ratio of the anode catalyst of the electrode reacting part.

This enables to provide an appropriate outer peripheral part by a simple manufacturing method or a simple material selection. This will be described in detail later. As a result, it is possible to maintain a good gas barrier property in the fuel cell. Moreover, there also is a secondary advantage that it is also possible to make the electrode reaction to proceed at the outer peripheral part.

Furthermore, as shown in FIG. 14, the present embodiment is also preferably configured to have the outer peripheral part 113, which has a portion 113A arranged in a way it overlaps with the cathode electrode layer 15 in a plan view.

This causes the boundary between the members of the anode electrode layer and the boundary between the member of the cathode electrode layer and the space to shift off, thus enabling to restrain or prevent the concentration of stress by the thermal stress difference. As a result, it is possible to maintain a good gas barrier property in the fuel cell.

Moreover, this causes the boundary between the members of the anode electrode layer and the boundary between the member of the cathode electrode layer and the space to shift off, thus physically and effectively restraining or preventing the bending deformation of the electrolyte layer that may occur along with the thermal expansion of the electrode reacting part, as compared to a case of the outer peripheral part having no part arranged in a way it overlaps with the cathode electrode layer in a plan view.

As a result, it is possible to maintain a good gas barrier property in the fuel cell.

Moreover, in the present embodiment also, it is preferable to have a configuration in which the outer peripheral part has a portion whose thickness becomes gradually reduced towards the outer edge.

Accordingly, no part, where a direction on which stress is applied significantly changes in a narrow range such as a level difference, is formed in the electrolyte layer. As a result, it is possible to maintain a good gas barrier property in the fuel cell.

Furthermore, in the present embodiment also, it is preferable to have a configuration in which the outer peripheral part becomes gradually reduced in thickness towards the inner edge side and has a portion in which a tip is arranged on the electrolyte layer side, and the electrode reacting part becomes gradually reduced in thickness towards its outer edge side and has a portion in which a tip is arranged on the supporting plate side.

By having the outer peripheral part being difficult to relatively thermally expand be positioned on the electrolyte layer side, the thermal expansion on the electrolyte side is restrained or prevented. As a result, it is possible to maintain a good gas barrier property in the fuel cell. Moreover, by having the electrode reacting part capable of thermally expanding relatively easily be positioned on the supporting plate side, the thermal expansion difference between the supporting plate and the anode electrode layer will be reduced, and microscopic release is restrained or prevented. As a result, it is possible to maintain a good gas barrier property in the fuel cell.

Figure 15:
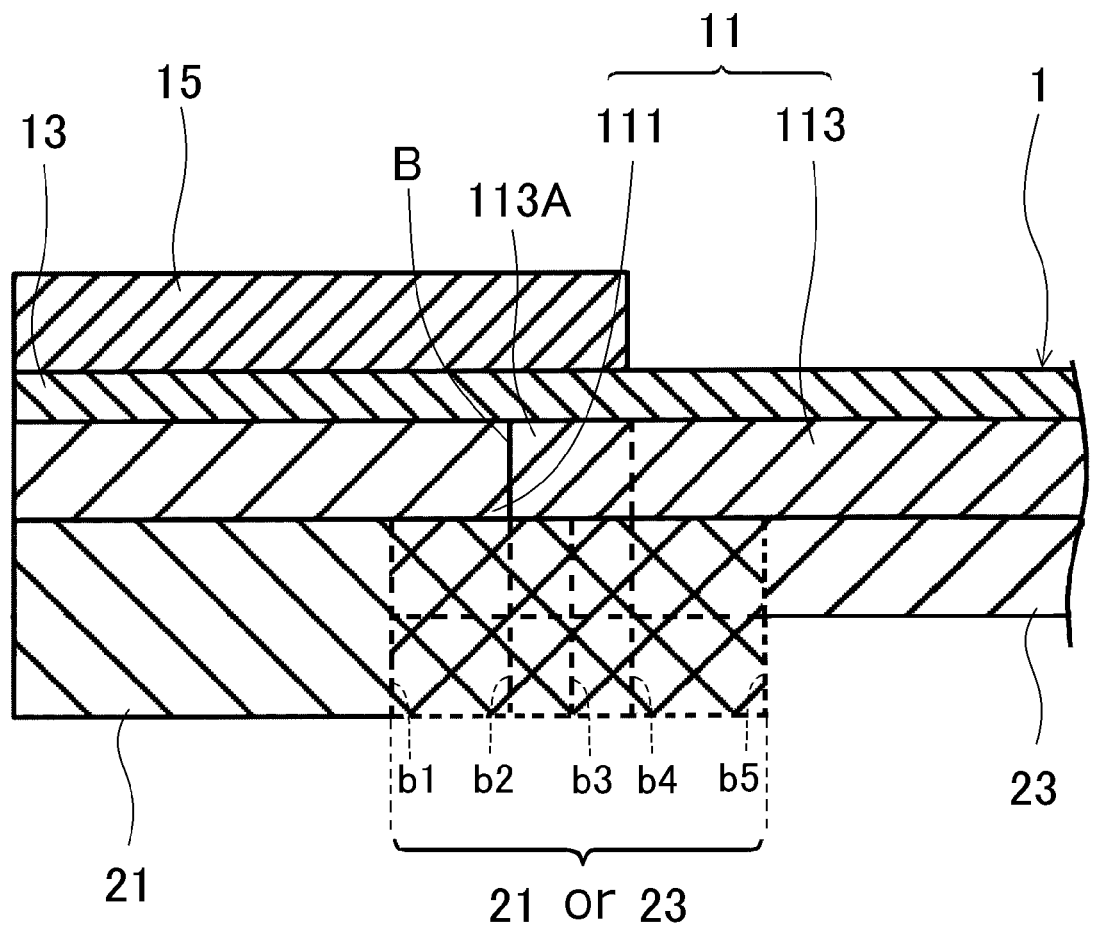
FIG. 15 is a cross-sectional view of a main part of first to fifth modifications of the fuel cell for illustrating the fourth embodiment.

Next describes in details of a modification of a fuel cell according to a fourth embodiment, with reference to the drawings. FIG. 15 is a cross-sectional view of a main part of first to fifth modifications of the fuel cell for illustrating the fourth embodiment.

The first to fourth modifications shown in FIG. 15 differ from the example shown in FIG. 14 in the position of the boundary between the main body 21 and the frame 23. In FIG. 15, the fifth modification whose boundary between the main body 21 and the frame 23 is boundary b5 is equivalent to the example shown in FIG. 14.

Namely, the first modification shown in FIG. 15 has a boundary b1 between the main body 21 and the frame 23, the boundary b1 being arranged on the inner side of the boundary B in a plan view. The second modification shown in FIG. 15 has a boundary b2 between the main body 21 and the frame 23, the boundary b2 being arranged in a way it overlaps with the boundary B in a plan view. The third modification shown in FIG. 15 has a boundary b3 between the main body 21 and the frame 23, the boundary b3 being arranged between the boundary B and the outer edge of the cathode electrode layer 15 in a plan view. The fourth modification shown in FIG. 15 has a boundary b4 between the main body 21 and the frame 23, the boundary b4 being arranged in a way it overlaps with the outer edge of the cathode electrode layer 15 in a plan view. The fifth modification shown in FIG. 15 has a boundary b5 between the main body 21 and the frame 23, the boundary b5 being arranged on the outer side of the outer edge of the cathode electrode layer 15 in a plan view.

As described above, in terms of restraining the concentration of stress caused by thermal stress difference, the first modification, third modification, and fifth modification (the example shown in FIG. 14) are more suitable than the second and fourth modifications. Moreover, the main body 21 is relatively closer to the electrode reacting part 111 where electrochemical reaction proceeds more than in the frame. Therefore, the main body and the frame may differ in a temperature environment, to which they are exposed. In such a case, in terms of restraining the concentration of stress caused by the difference in the temperature environment, to which they are exposed, the fifth modification (the example shown in FIG. 14) may be considered as more suitable than the first and third modifications.

Figure 16:
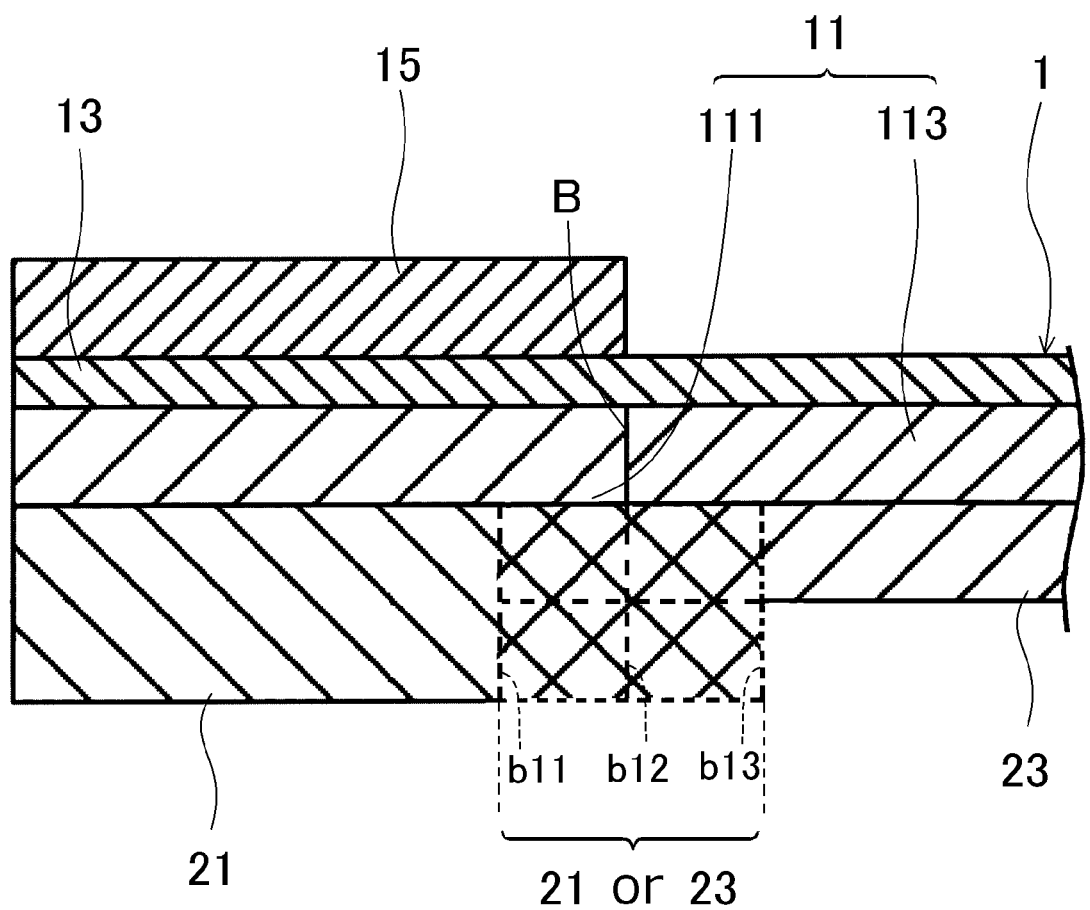
FIG. 16 is a cross-sectional view of a main part of sixth to eighth modifications of the fuel cell for illustrating the fourth embodiment.

FIG. 16 is a cross-sectional view of a main part of sixth to eighth modifications of the fuel cell for illustrating the fourth embodiment.

In the sixth to eighth modifications shown in FIG. 16, the position of the boundary B between the outer peripheral part 113 and the electrode reacting part 111 is identical to that of the example shown in FIG. 4, and the position of the boundary between the main body 21 and the frame 23 differs from that of the example shown in FIG. 14.

Namely, the sixth modification shown in FIG. 16 has a boundary b11 between the main body 21 and the frame 23, the boundary b11 being arranged on the inner side of the boundary B in a plan view. The seventh modification shown in FIG. 16 has a boundary b12 between the main body 21 and the frame 23, the boundary b12 being arranged in a way it overlaps with the boundary B in a plan view. The eighth modification shown in FIG. 16 has a boundary b13 between the main body 21 and the frame 23, the boundary b13 being arranged on outer side of the outer edge of the cathode electrode layer 15.

As described above, in terms of restraining the concentration of stress caused by the thermal stress difference, the sixth embodiment and eighth embodiment are more suitable than the seventh modification. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, the eighth modification may be considered as more suitable than the sixth modification.

Figure 17:
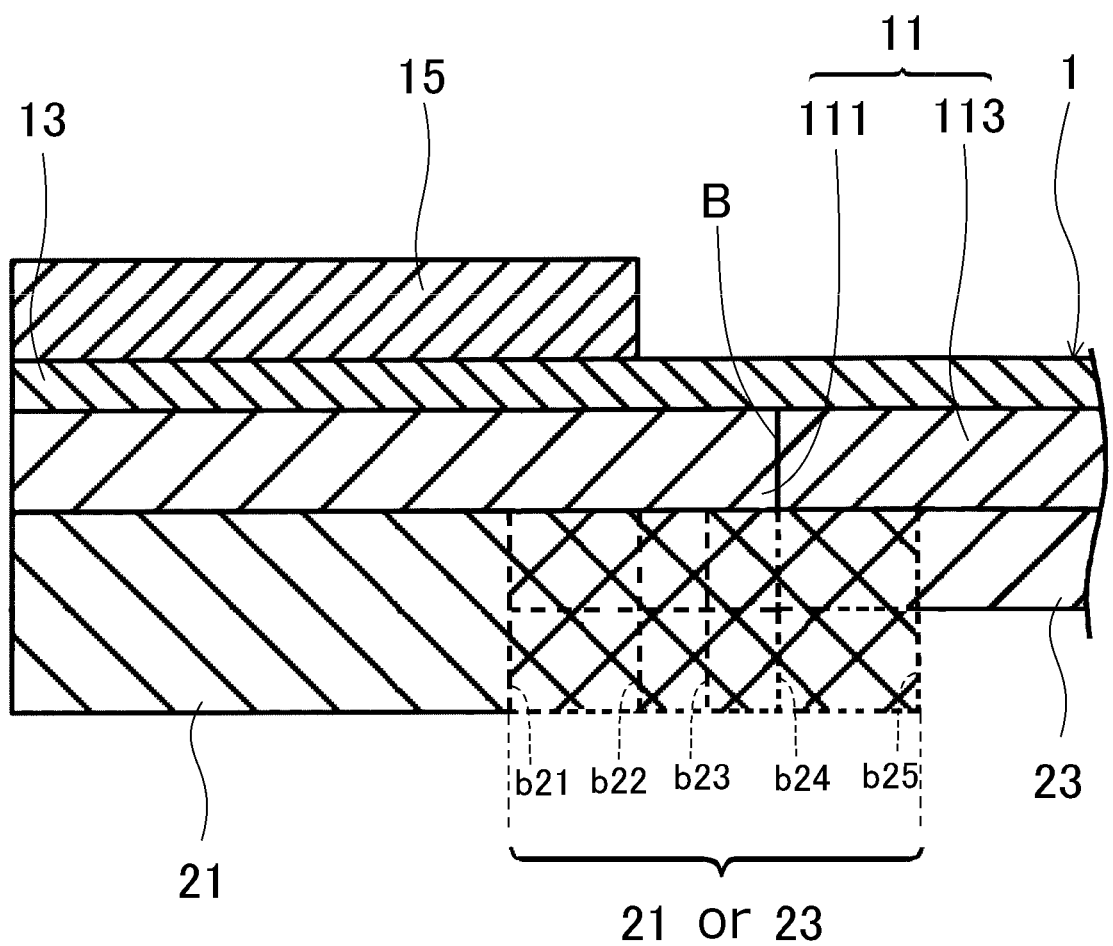
FIG. 17 is a cross-sectional view of a main part of ninth to thirteenth modifications of the fuel cell for illustrating the fourth embodiment.

FIG. 17 is a cross-sectional view of a main part of ninth to thirteenth modifications of the fuel cell for illustrating the fourth embodiment.

In the ninth to thirteenth modifications shown in FIG. 17, the position of the boundary B between the outer peripheral part 113 and the electrode reacting part 111 is identical to that of the example shown in FIG. 5, and the position of the boundary between the main body 21 and the frame 23 differs from that of the example shown in FIG. 14.

Namely, the ninth modification shown in FIG. 17 has a boundary b21 between the main body 21 and the frame 23, the boundary b21 being arranged on the inner side of the outer edge of the cathode electrode layer 15 in a plan view. The tenth modification shown in FIG. 17 has a boundary b22 between the main body 21 and the frame 23, the boundary b22 being arranged in a way it overlaps with the outer edge of the cathode electrode layer 15 in a plan view. The eleventh modification shown in FIG. 17 has a boundary b23 between the main body 21 and the frame 23, the boundary b23 being arranged between the outer of the cathode electrode layer 15 and the boundary B in a plan view. The twelfth modification shown in FIG. 17 has a boundary b24 between the main body 21 and the frame 23, the boundary b24 being arranged in a way it overlaps with the boundary B in a plan view. The thirteenth modification shown in FIG. 17 has a boundary b25 between the main body 21 and the frame 23, the boundary b25 being arranged on the outer side of the boundary B in a plan view.

As described above, in terms of restraining the concentration of stress caused by the thermal stress difference, the ninth modification, eleventh modification and thirteenth modification are more suitable than the tenth and twelfth modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, the thirteenth modification is considered more suitable than the ninth and eleventh modifications.

Figure 18:
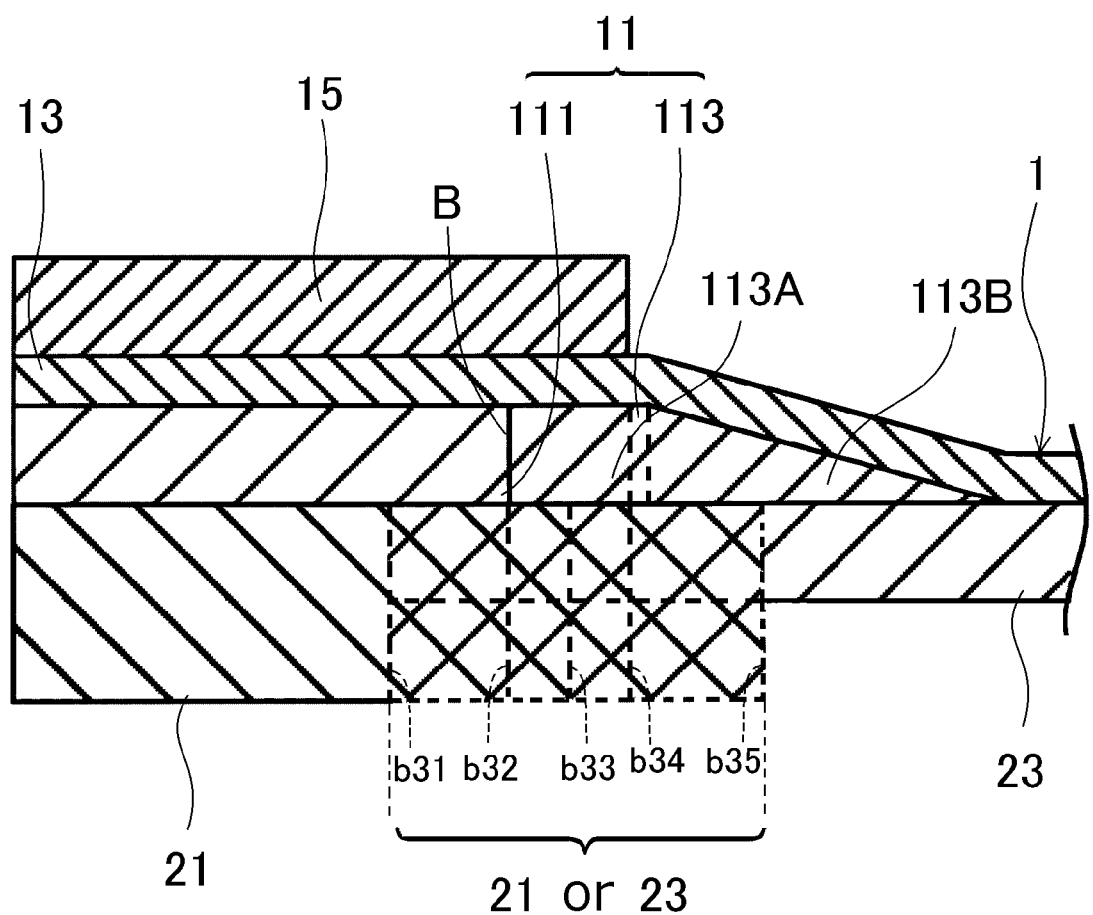
FIG. 18 is a cross-sectional view of a main part of fourteenth to eighteenth modifications of the fuel cell for illustrating the fourth embodiment.

FIG. 18 is a cross-sectional view of a main part of fourteenth to eighteenth modifications of the fuel cell for illustrating the fourth embodiment.

In the fourteenth to eighteenth modifications shown in FIG. 18, the position of the boundary B between the outer peripheral part 113 and the electrode reacting part 111 is identical to that of the example shown in FIG. 6, and the position of the boundary between the main body 21 and the frame 23 differs from that of the example shown in FIG. 14.

Namely, the fourteenth modification shown in FIG. 18 has a boundary b31 between the main body 21 and the frame 23, the boundary b31 being arranged on the inner side of the boundary B in a plan view. The fifteenth modification shown in FIG. 18 has a boundary b32 between the main body 21 and the frame 23, the boundary b32 being arranged in a way it overlaps with the boundary B in a plan view. The sixteenth modification shown in FIG. 18 has a boundary b33 between the main body 21 and the frame 23, the boundary b33 being arranged between the boundary B and the outer edge of the cathode electrode layer 15 in a plan view. The seventeenth modification shown in FIG. 18 has a boundary b34 between the main body 21 and the frame 23, the boundary b34 being arranged in a way it overlaps with the outer edge of the cathode electrode layer 15 in a plan view. The eighteenth modification shown in FIG. 18 has a boundary b35 between the main body 21 and the frame 23, the boundary b35 being arranged on the outer side of the outer edge of the cathode electrode layer 15 in a plan view.

As described above, in terms of restraining the concentration of stress caused by the thermal stress difference, the fourteenth modification, sixteenth modification, and eighteenth modification are more suitable than the fifteenth and seventeenth modifications. Moreover, the main body 21 is relatively closer to the electrode reacting part 111, where electrochemical reaction proceeds more than in the frame. Therefore, the main body and the frame may differ in the temperature environment, to which they are exposed, in such a case, in terms of restraining the concentration in stress caused by the difference in the temperature environment, to which they are exposed, the eighteenth modification is considered more suitable than the fourteenth and sixteenth modifications. However, in consideration of the occurrence of the concentration in stress caused by the difference in the temperature environment, to which they are exposed, in terms of arranging the boundary at a relatively thick part of the anode electrode layer, it is also considered that the fourteenth modification and sixteenth modification are more suitable than the eighteenth modification.

Figure 19:
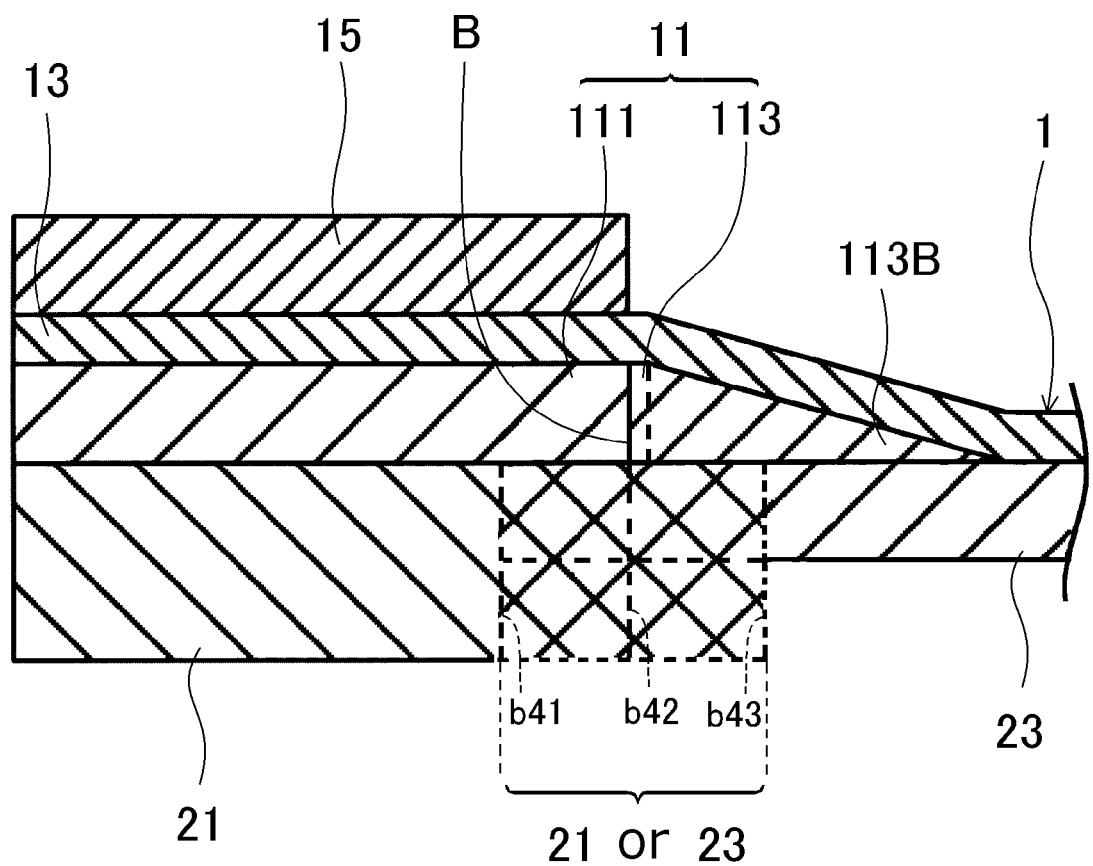
FIG. 19 is a cross-sectional view of a main part of nineteenth to twenty-first modifications of the fuel cell for illustrating the fourth embodiment.

FIG. 19 is a cross-sectional view of a main part of nineteenth to twenty-first modifications of the fuel cell for illustrating the fourth embodiment.

In the nineteenth to twenty-first modifications shown in FIG. 19, the position of the boundary B between the outer peripheral part 113 and the electrode reacting part 111 is identical to that of the example shown in FIG. 7, and the position of the boundary between the main body 21 and the frame 23 differs from that of the example shown in FIG. 14.

Namely, the nineteenth modification shown in FIG. 19 has a boundary b41 between the main body 21 and the frame 23, the boundary b41 being arranged on the inner side of the boundary B in a plan view. The twentieth modification shown in FIG. 19 has a boundary b42 between the main body 21 and the frame 23, the boundary b42 being arranged in a way it overlaps with the boundary B in a plan view. The twenty-first modification shown in FIG. 19 has a boundary b43 between the main body 21 and the frame 23, the boundary b43 being arranged on the outer side of the boundary B in a plan view.

As described above, in terms of restraining the concentration of stress caused by the thermal stress difference, the nineteenth modification and twentieth modification are more suitable than the twentieth modification. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, the twenty-first modification is considered more suitable than the nineteenth modification. However, in consideration of the occurrence of the concentration in stress caused by the difference in the temperature environment, to which they are exposed, in terms of arranging the boundary at a relatively thick part of the anode electrode layer, it is also considered that the nineteenth modification is more suitable than the twenty-first modification.

Figure 20:
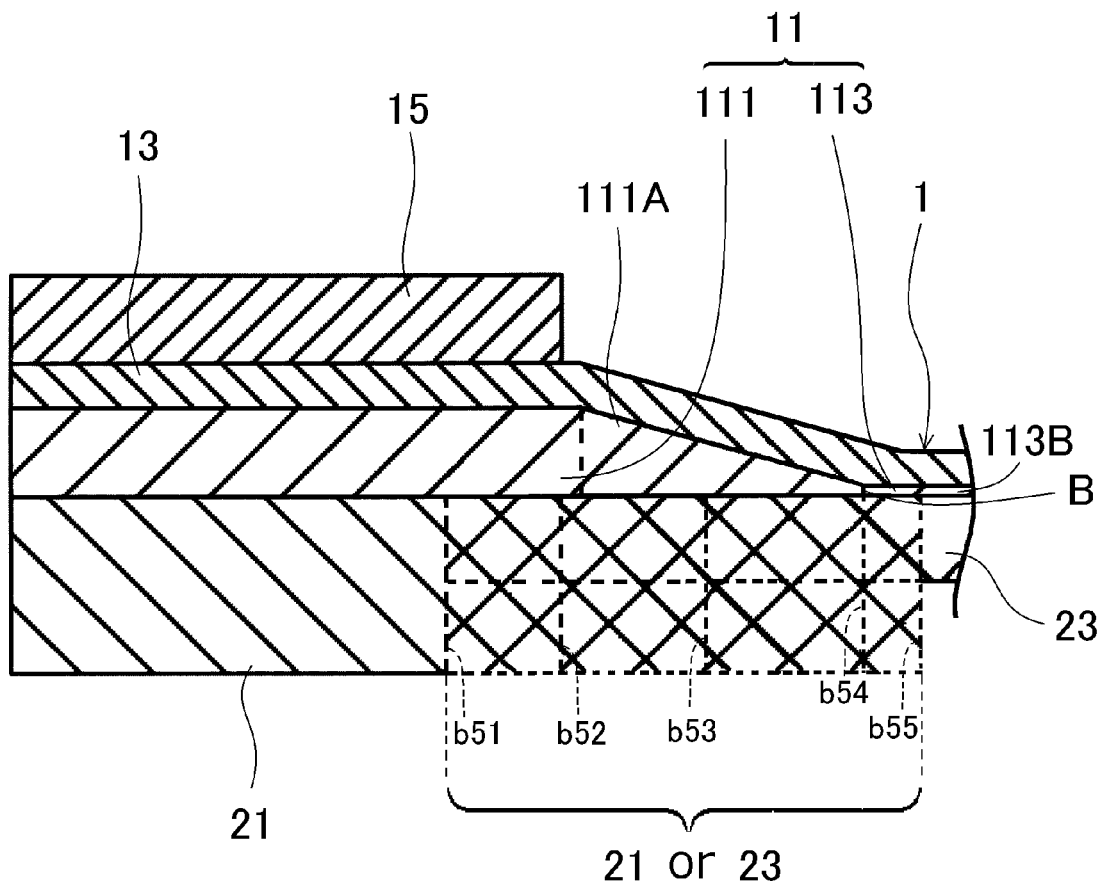
FIG. 20 is a cross-sectional view of a main part of twenty-second to twenty-sixth modifications of the fuel cell for illustrating the fourth embodiment.

FIG. 20 is a cross-sectional view of a main part of twenty-second to twenty-sixth modifications of the fuel cell for illustrating the fourth embodiment.

In the twenty-second to twenty-sixth modifications shown in FIG. 20, the position of the boundary B between the outer peripheral part 113 and the electrode reacting part 111 is identical to that of the example shown in FIG. 8, and the position of the boundary between the main body 21 and the frame 23 differs from that of the example shown in FIG. 14.

Namely, the twenty-second modification shown in FIG. 20 has a boundary b51 between the main body 21 and the frame 23, the boundary b51 being arranged on the inner side of the outer edge of the cathode electrode layer 15 in a plan view. The twenty-third modification shown in FIG. 20 has a boundary b52 between the main body 21 and the frame 23, the boundary b52 being arranged in a way it overlaps with the outer edge of the cathode electrode layer 15 in a plan view. The twenty-fourth modification shown in FIG. 20 has a boundary b53 between the main body 21 and the frame 23, the boundary b53 being arranged between the outer edge of the cathode electrode layer 15 and the boundary B in a plan view. The twenty-fifth modification shown in FIG. 20 has a boundary b54 between the main body 21 and the frame 23, the boundary b54 being arranged in a way it overlaps with the boundary B in a plan view. The twenty-sixth modification shown in FIG. 20 has a boundary b55 between the main body 21 and the frame 23, the boundary b55 being arranged on the outer side of the boundary B in a plan view.

As described above, in terms of restraining the concentration of stress caused by the thermal stress difference, the twenty-second modification, twenty-fourth modification, and twenty-sixth modification are more suitable than the twenty-third and twenty-fifth modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, it is considered that the twenty-fourth modification and twenty-sixth modification are more suitable than the twenty-second modification. However, in consideration of the occurrence of the concentration in stress caused by the difference in the temperature environment, to which they are exposed, in terms of arranging the boundary at a relatively thick part of the anode electrode layer, it is also considered that the twenty-second modification is more suitable than twenty-fourth and twenty-sixth modifications.

Figure 21:
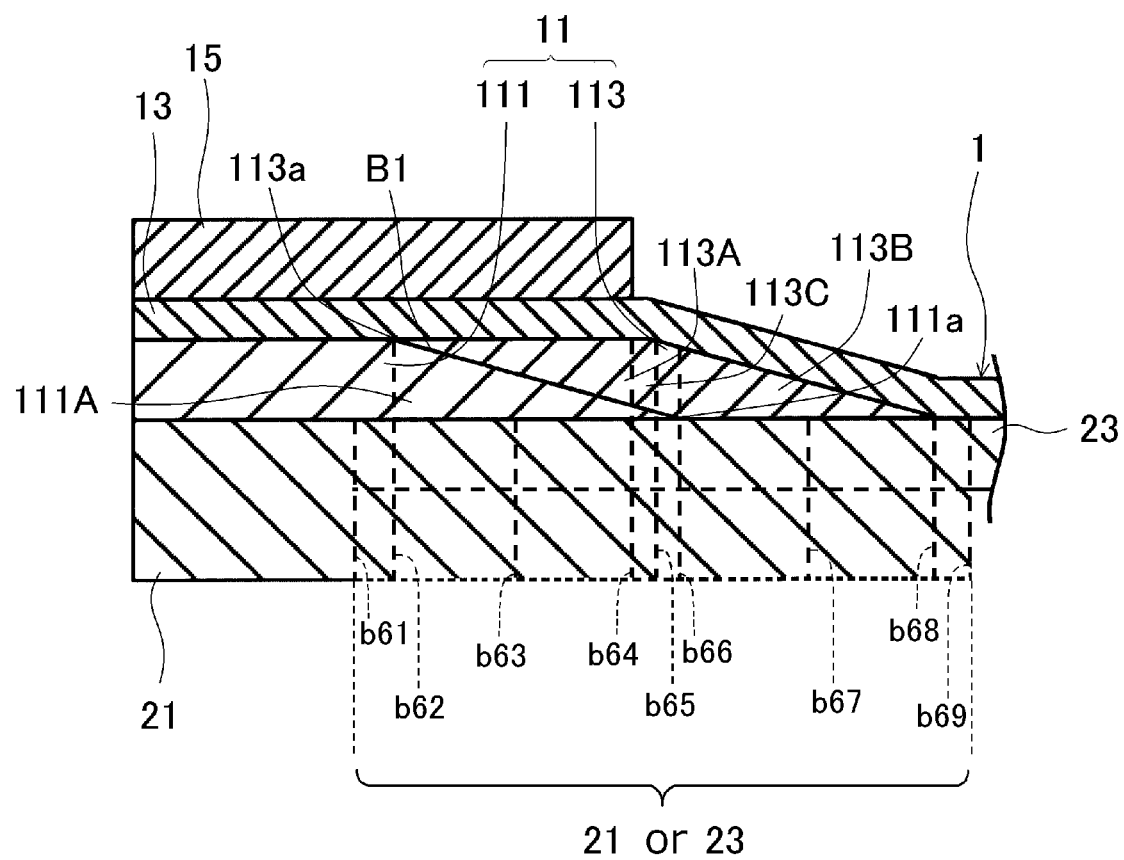
FIG. 21 is a cross-sectional view of a main part of twenty-seventh to thirty-fifth modifications of the fuel cell for illustrating the fourth embodiment.

FIG. 21 is a cross-sectional view of a main part of twenty-seventh to thirty-fifth modifications of the fuel cell for illustrating the fourth embodiment.

In the twenty-seventh to thirty-fifth modification shown in FIG. 21, the position of the boundary B1 between the outer peripheral part 113 and the electrode reacting part 111 is identical to that of the example shown in FIG. 9, and the position of the boundary between the main body 21 and the frame 23 differs from that of the example shown in FIG. 14.

Namely the twenty-seventh modification shown in FIG. 21 has a boundary b61 between the main body 21 and the frame 23, the boundary b61 being arranged on the inner side of the tip 113a in a plan view. The twenty-eighth modification shown in FIG. 21 has a boundary b62 between the main body 21 and the frame 23, the boundary b62 being arranged in a way it overlaps with the tip 113a in a plan view. The twenty-ninth modification shown in FIG. 21 has a boundary b63 between the main body 21 and the frame 23, the boundary b63 being arranged between the tip 113a and the outer edge of the cathode electrode layer 15 in a plan view. The thirtieth modification shown in FIG. 21 has a boundary b64 between the main body 21 and the frame 23, the boundary b64 being arranged in a way it overlaps with the outer edge of the cathode electrode layer 15 in a plan view. The thirty-first modification shown in FIG. 21 has a boundary b65 between the main body 21 and the frame 23, the boundary b65 being arranged between the outer edge of the cathode electrode layer 15 and the tip 111a in a plan view. The thirty-second modification shown in FIG. 21 has a boundary b66 between the main body 21 and the frame 23, the boundary b66 being arranged in a way it overlaps with the tip 111a in a plan view. The thirty-third modification shown in FIG. 21 has a boundary b67 between the main body 21 and the frame 23, the boundary b67 being arranged between the tip 111a and the outer edge of the anode electrode layer 11 in a plan view. The thirty-fourth modification shown in FIG. 21 has a boundary b68 between the main body 21 and the frame 23, the boundary b68 being arranged in a way it overlaps with the outer edge of the anode electrode layer 11 in a plan view. The thirty-fifth modification shown in FIG. 21 has a boundary b69 between the main body 21 and the frame 23, the boundary b69 being arranged on the outer side of the outer edge of the anode electrode layer 11 in a plan view.

As described above, in terms of restraining the concentration of stress caused by the thermal stress difference, the twenty-seventh modification, twenty-ninth modification, thirty-first modification, thirty-third modification, and thirty-fifth modification are more suitable than the twenty-eighth, thirtieth, thirty-second and thirty-fourth modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress due to the difference in the temperature environment, to which they are exposed, it is considered that the thirty-third modification and thirty-fifth modification are more suitable than the twenty-seventh, twenty-ninth, and thirty-first modifications. However, in consideration of the occurrence of the concentration in stress caused by the difference in the temperature environment, to which they are exposed, in terms of arranging the boundary at a relatively thick part of the anode electrode layer, it is also considered that the twenty-seventh modification, twenty-ninth modification, and thirty-first modification are more suitable than the thirty-third and thirty-fifth modifications.

Figure 22:
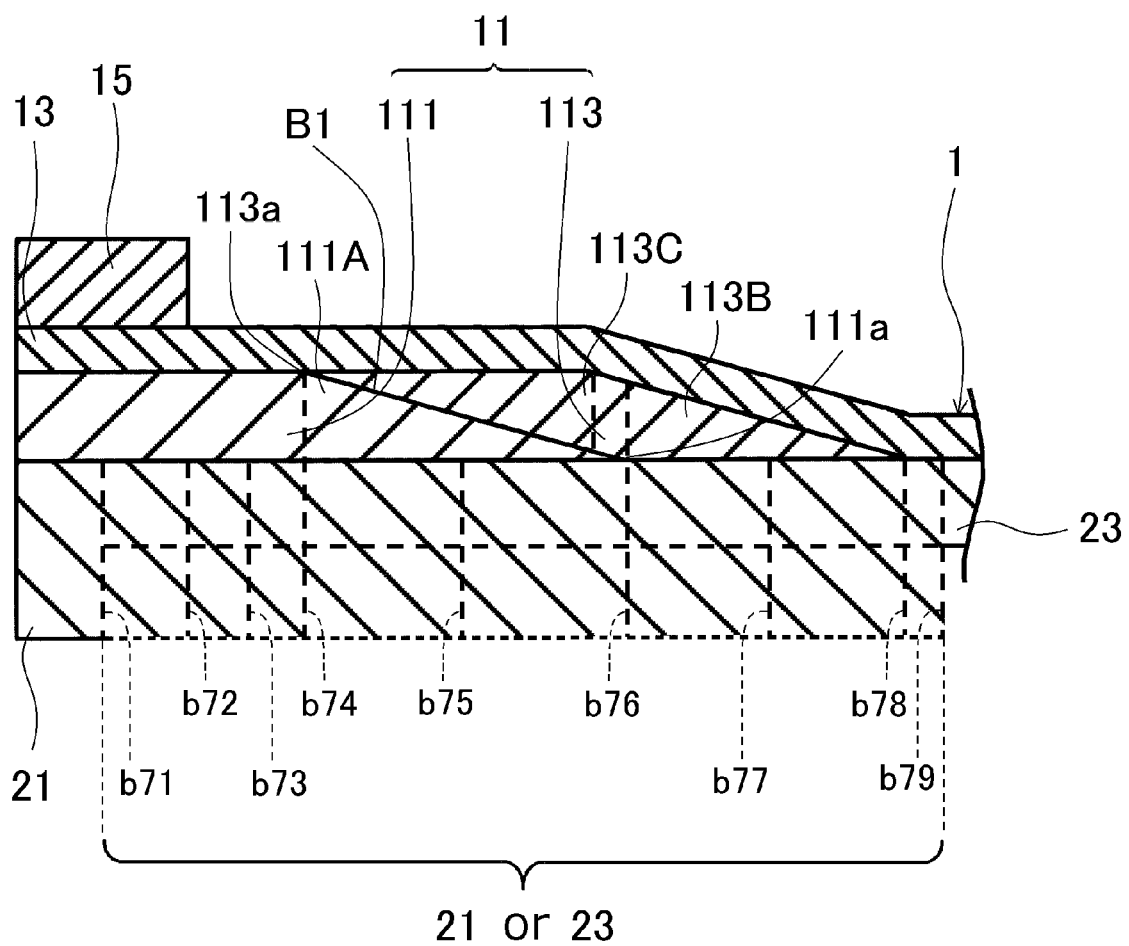
FIG. 22 is a cross-sectional view of a main part of thirty-sixth to forty-fourth modifications of the fuel cell for illustrating the fourth embodiment.

In the thirty-sixth to forty-fourth modifications shown in FIG. 22, the position of the boundary B1 between the outer peripheral part 113 and the electrode reacting part 111 is identical to that of the example shown in FIG. 10, and the position of the boundary between the main body 21 and the frame 23 differs from that of the example shown in FIG. 14.

Namely, the thirty-sixth modification shown in FIG. 22 has a boundary b71 between the main body 21 and the frame 23, the boundary b71 being arranged on the inner side of the outer edge of the cathode electrode layer 15 in a plan view. The thirty-seventh modification shown in FIG. 22 has a boundary b72 between the main body 21 and the frame 23, the boundary b72 being arranged in a way it overlaps with the outer edge of the cathode electrode layer 15 in a plan view. The thirty-eighth modification shown in FIG. 22 has a boundary b73 between the main body 21 and the frame 23, the boundary b73 being arranged between the outer of the cathode electrode layer 15 and the tip 113a in a plan view. The thirty-ninth modification shown in FIG. 22 has a boundary b74 between the main body 21 and the frame 23, the boundary b74 being arranged in a way it overlaps with the tip 113a in a plan view. The fortieth modification shown in FIG. 22 has a boundary b75 between the main body 21 and the frame 23, the boundary b75 being arranged between the tip 113a and the tip 111a in a plan view. The forty-first modification shown in FIG. 22 has a boundary b76 between the main body 21 and the frame 23, the boundary b76 being arranged in a way it overlaps with the tip 111a in a plan view. The forty-second modification shown in FIG. 22 has a boundary b77 between the main body 21 and the frame 23, the boundary b77 being arranged between the tip 111a and the outer edge of the anode electrode layer 11 in a plan view. The forty-third modification shown in FIG. 22 has a boundary b78 between the main body 21 and the frame 23, the boundary b78 being arranged in a way it overlaps with the outer edge of the anode electrode layer 11 in a plan view. The forty-fourth modification shown in FIG. 22 leas a boundary b79 between the main body 21 and the frame 23, the boundary b79 being arranged on the outer side of the outer edge of the anode electrode layer 11 in a plan view.

As described above, in terms of restraining the concentration of stress caused by the thermal stress difference, the thirty-sixth modification, thirty-eighth modification, fortieth modification, forty-second modification, and forty-fourth modification are more suitable than the thirty-seventh, thirty-ninth, forty-first and forty-third modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, it is considered that the forty-second modification and forty-fourth modification are more suitable than the thirty-sixth, thirty-eighth and fortieth modifications. However, in consideration of the occurrence of the concentration in stress caused by the difference in the temperature environment, to which they are exposed, in terms of arranging the boundary at a relatively thick part of the anode electrode layer, it is also considered that the thirty-sixth modification, thirty-eighth modification, and fortieth modification are more suitable than the forty-second and forty-fourth modifications.

Figure 23:
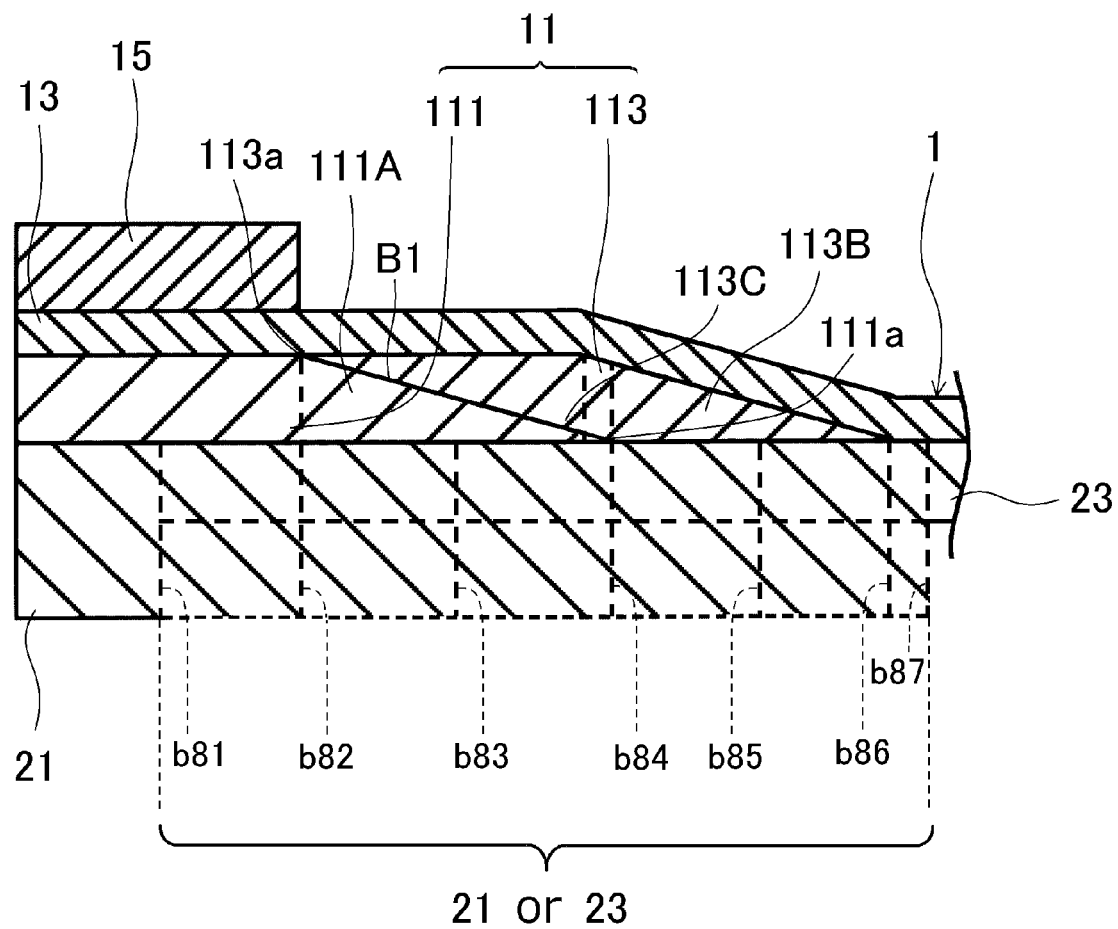
FIG. 23 is a cross-sectional view of a main part of forty-fifth to fifty-first modifications of the fuel cell for illustrating the fourth embodiment.

In the forty-fifth to fifty-first modification shown in FIG. 23, the position of the boundary B1 between the outer peripheral part 113 and the electrode reacting part 111 is identical to that of the example shown in FIG. 11, and the position of the boundary between the main body 21 and the frame 23 differs from that of the example shown in FIG. 14.

Namely, the forty-fifth modification shown in FIG. 23 has a boundary b81 between the main body 21 and the frame 23, the boundary b81 being arranged on the inner side of the outer edge of the cathode electrode layer 15 in a plan view. The forty-sixth modification shown in FIG. 23 has a boundary b82 between the main body 21 and the frame 23, the boundary b82 arranged in a way it overlaps with the outer edge of the cathode electrode layer 15 in a plan view. The forty-seventh modification shown in FIG. 23 has a boundary b83 between the main body 21 and the frame 23, the boundary b83 being arranged between the outer edge of the cathode electrode layer 15 and the tip 111a in a plan view. The forty-eighth modification shown in FIG. 23 has a boundary b84 between the main body 21 and the frame 23, the boundary b84 being arranged in a way it overlaps with the tip 111a in a plan view. The forty-ninth modification shown to in FIG. 23 has a boundary b85 between the main body 21 and the frame 23, the boundary b85 being arranged between the tip 111a and the outer edge of the anode electrode layer 11 in a plan view. The fiftieth modification shown in FIG. 23 has a boundary b86 between the main body 21 and the frame 23, the boundary b86 being arranged in a way it overlaps with the outer edge of the anode electrode layer 11 in a plan view. The fifty-first modification shown in FIG. 23 has a boundary b87 between the main body 21 and the frame 23, the boundary b87 being arranged on the outer side of the outer edge of the anode electrode layer 11 in a plan view.

As described above, in terms of restraining the concentration of stress caused by the thermal stress difference, the forty-fifth modification, forty-seventh modification, forty-ninth modification, and fifty-first modification are more suitable than the forty-sixth, forty-eighth, and fiftieth modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, it is considered that the forty-ninth modification and fifty-first modification are more suitable than the forty-fifth and forty-seventh modifications. However, in consideration of the occurrence of the concentration in stress caused by the difference in the temperature environment, to which they are exposed, in terms of arranging the boundary at a relatively thick part of the anode electrode layer, it is also considered that the forty-fifth modification and forty-seventh modification are more suitable than the forty-ninth and fifty-first modifications.

Figure 24:
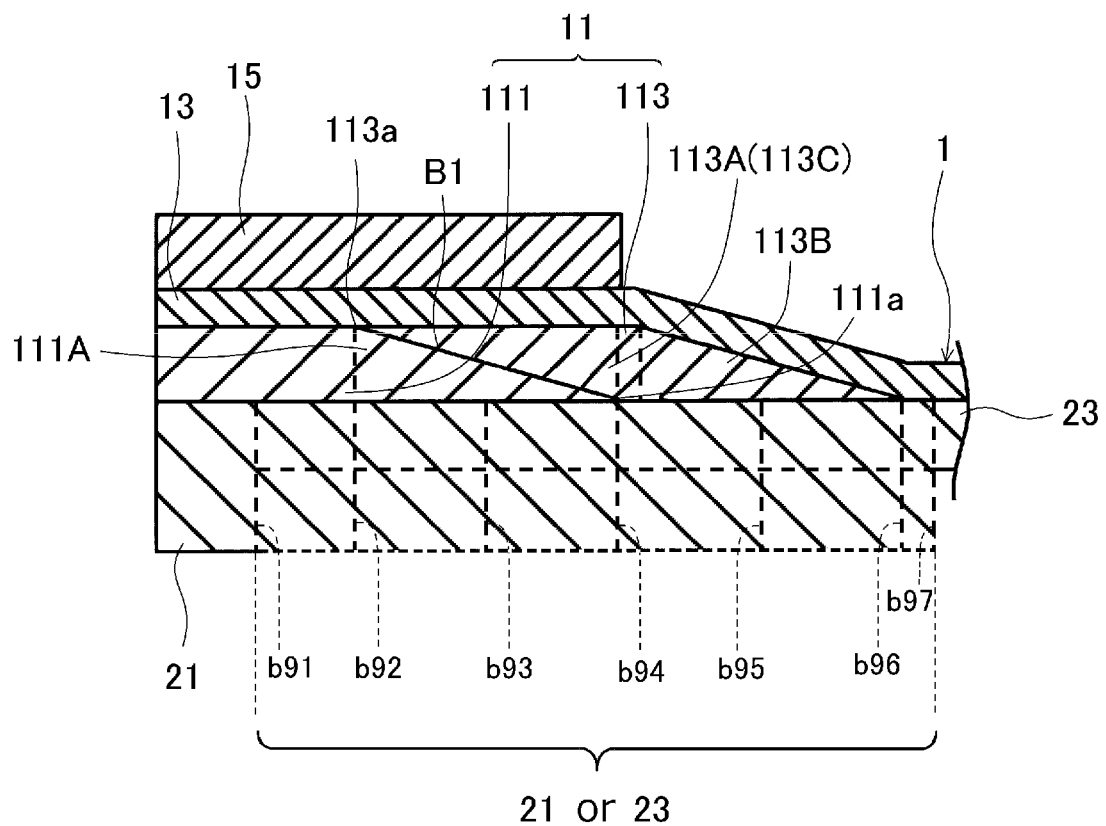
FIG. 24 is a cross-sectional view of a main part of fifty-second to fifty-eighth modifications of the fuel cell for illustrating the fourth embodiment.

In fifty-second to fifty-eighth modifications shown in FIG. 24, the position of the boundary B1 between the outer peripheral part 113 and the electrode reacting part 111 is identical to that of the example shown in FIG. 12, and the position of the boundary between the main body 21 and the frame 23 differs from that of the example shown in FIG. 14.

Namely, the fifty-second modification shown in FIG. 24 has a boundary b91 between the main body 21 and the frame 23, the boundary b91 being arranged on the inner side of the tip 113a in a plan view. The fifty-third modification shown in FIG. 24 has a boundary b92 between the main body 21 and the frame 23, the boundary b92 being arranged in a way it overlaps with the tip 113a in a plan view. The fifty-fourth modification shown in FIG. 24 has a boundary b93 between the main body 21 and the frame 23, the boundary b93 being arranged between the tip 113a and the tip 111a in a plan view. The fifty-fifth modification shown in FIG. 24 has a boundary b94 between the main body 21 and the frame 23, the boundary b94 being arranged in a way it overlaps with the tip 111a in a plan view. The fifty-sixth modification shown in FIG. 24 has a boundary b95 between the main body 21 and the frame 23, the boundary b95 being arranged between the tip 111a and the outer edge of the anode electrode layer 11 in a plan view. The fifty-seventh modification shown in FIG. 24 has a boundary b96 between the main body 21 and the frame 23, the boundary b96 being arranged in a way it overlaps with the outer edge of the anode electrode layer 11 in a plan view. The fifty-eighth modification shown in FIG. 24 has a boundary b97 between the main body 21 and the frame 23, the boundary b97 being arranged on the outer side of the outer edge of the anode electrode layer 11 in a plan view.

As described above, in terms of restraining the concentration of stress caused by the thermal stress difference, the fifty-second modification, fifty-fourth modification, fifty-sixth modification, and fifty-eighth modification are more suitable than the fifty-third, fifty-fifth and fifty-seventh modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration in stress caused by the difference in the temperature environment, to which they are exposed, it is considered that the fifty-sixth modification and fifty-eighth modification are more suitable than the fifty-second and fifty-fourth modifications. However, in consideration of the occurrence of the concentration in stress caused by the difference in the temperature environment, to which they are exposed, in terms of arranging the boundary at a relatively thick part of the anode electrode layer, it is also considered that the fifty-second modification and fifty-fourth modification are more suitable than the fifty-sixth and fifty-eighth modifications.

Figure 25:
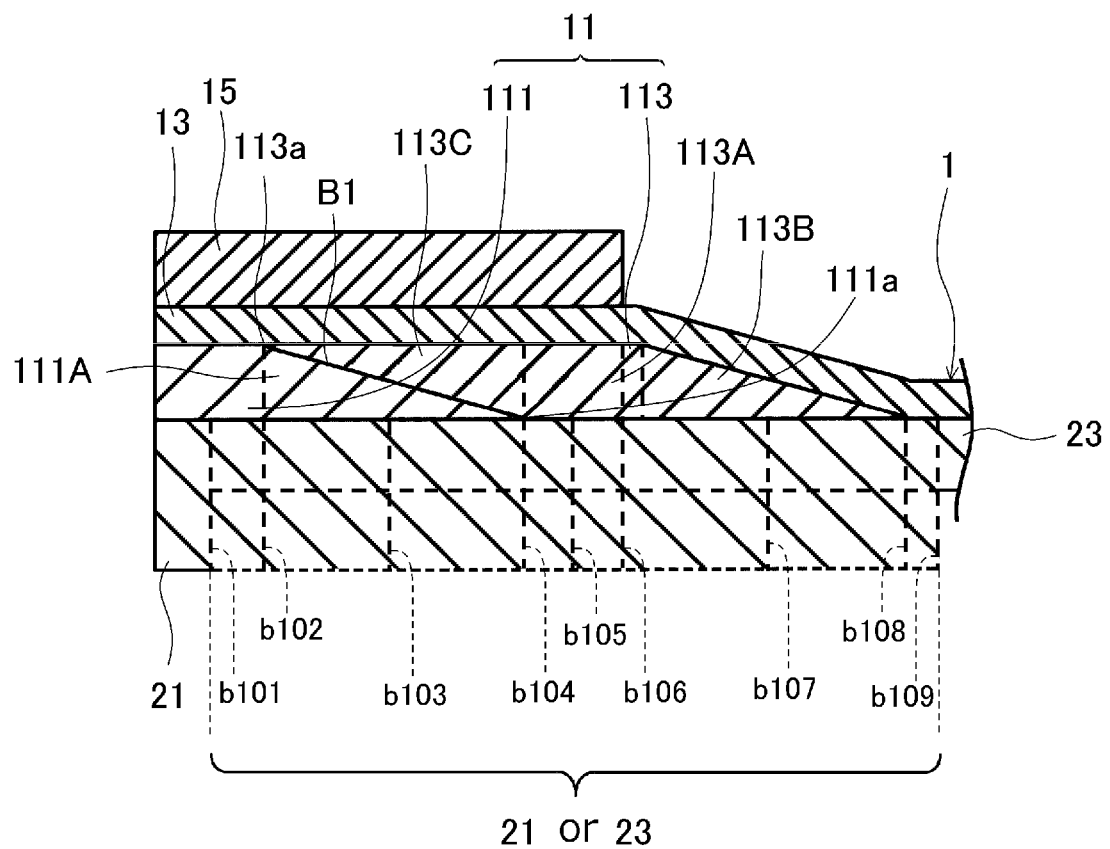
FIG. 25 is a cross-sectional view of a main part of fifty-ninth to sixty-seventh modifications of the fuel cell for illustrating the fourth embodiment.

In fifty-ninth to sixty seventh modifications shown in FIG. 25, the position of the boundary B1 between the outer peripheral part 113 and the electrode reacting part 111 is identical to that of the example shown in FIG. 13, and the position of the boundary between the main body 21 and the frame 23 differs from that of the example shown in FIG. 14.

Namely, the fifty-ninth modification shown in FIG. 25 has a boundary b101 between the main body 21 and the frame 23, the boundary b101 being arranged on the inner side of the tip 113a in a plan view. The sixtieth modification shown in FIG. 25 has a boundary b102 between the main body 21 and the frame 23, the boundary b102 being arranged in a way it overlaps with the tip 113a in a plan view. The sixty-first modification shown in FIG. 25 has a boundary b103 between the main body 21 and the frame 23, the boundary b103 being arranged between the tip 113a and the tip 111a in a plan view. The sixty-second modification shown in FIG. 25 has a boundary b104 between the main body 21 and the frame 23, the boundary b104 being arranged in a way it overlaps with the tip 111a in a plan view. The sixty-third modification shown in FIG. 25 has a boundary b105 between the main body 21 and the frame 23, the boundary b105 being arranged between the tip 111a and the outer edge of the anode electrode layer 11 in a plan view. The sixty-fourth modification shown in FIG. 25 has a boundary b106 between the main body 21 and the frame 23, the boundary b106 being arranged in a way it overlaps with the outer edge of the anode electrode layer 11 in a plan view. The sixty-fifth modification shown in FIG. 25 has a boundary b107 between the main body 21 and the frame 23, the boundary b107 being arranged between the outer edge of the cathode electrode layer 15 and the outer edge of the anode electrode layer 11 in a plan view. The sixty-sixth modification shown in FIG. 25 has a boundary b108 between the main body 21 and the frame 23, the boundary b108 being arranged in a way it overlaps with the outer edge of the anode electrode layer 11 in a plan view. The sixty-seventh modification shown in FIG. 25 has a boundary b109 between the main body 21 and the frame 23, the boundary b109 being arranged on the outer side of the outer edge of the anode electrode layer 11 in a plan view.

As described above, in terms of restraining the concentration of stress caused by the thermal stress difference, the fifty-ninth modification, sixty-first modification, sixty-third modification, sixty-fifth modification, and sixty-seventh modification are more suitable than the sixtieth, sixty-second, sixty-fourth and sixty-sixth modifications. Moreover, the main body 21 is relatively closer to the electrode reacting part 111, where electrochemical reaction proceeds more than in the frame. Therefore, the main body and the frame may differ in the temperature environment, to which they are exposed. In such a case, in terms of restraining the concentration stress caused by the difference in the temperature environment, to which they are exposed, it is considered that the sixty-fifth modification and sixty-seventh modification are more suitable than the fifty-ninth, sixty-first and sixty-third modifications. However, in consideration of the occurrence of the concentration in stress caused by the difference in the temperature environment, to which they are exposed, in terms of arranging the boundary at a relatively thick part of the anode electrode layer, it is also considered that the fifty-ninth modification, sixty-first modification, and sixty-third modification are more suitable than the sixty-fifth and sixty-seventh modifications.

The fuel cells of the aforementioned embodiments can be manufactured by the following methods, for example. The following manufacturing method of the fuel cell below is merely one example, and the fuel cell of the present invention is not limited to those obtained by the manufacturing method below.

For example, a slurry for forming an anode electrode layer containing a Ni particles/YSZ particles mixture and so on is first coated by screen printing on a porous metal substrate such as chromium-5 mass % iron alloy that serves as a metallic supporting plate, to form an anode coated layer. Here, for the forming of the electrode reacting part, a slurry for forming an anode electrode layer with a high content ratio of Ni particles is used, as compared to the formation of the outer peripheral part. More specifically, for the formation of the electrode reacting part, cermet made of nickel (Ni) and yttria-stabilized zirconia (YSZ) (Ni:YSZ 50:50 (mass ratio)) may be used, and for the formation of the outer peripheral part, cermet made of nickel (Ni) and yttria-stabilized zirconia (YSZ) (Ni:YSZ 20:80 (mass ratio)) may be used.

Next, a slurry for forming an electrolyte layer containing example 8 mol % YSZ particles and so on is coated on the anode coated layer, to form an electrolyte coated layer.

Furthermore, by sintering at 1000° C. under a reducing atmosphere such as a hydrogen atmosphere, on the porous substrate are formed an anode electrode layer having the predetermined electrode reacting part and outer peripheral part, and an electrolyte layer.

Furthermore, a slurry for forming a diffusion prevention layer, which slurry contains ceria-based oxide particles and so on is coated on the electrolyte layer by screen printing, and this is sintered at 1000° C. under a reducing atmosphere such as a hydrogen atmosphere, to form a diffusion prevention layer on the electrolyte layer.

Thereafter, a slurry for forming a cathode electrode layer, which slurry contains lanthanum strontium cobalt ferrite (LSCF) and so on, is coated on the diffusion prevention layer by screen printing, and this is sintered at 1000° C. under a reducing atmosphere such as a hydrogen atmosphere, to form a cathode electrode layer on the diffusion prevention layer.

This achieves an average thermal expansion coefficient at 800° C. in the electrode reacting part of $12.5 \times 10^{-6}$/K, an average thermal expansion coefficient at 800° C. in the outer peripheral part of $11.0 \times 10^{-6}$/K, and an average thermal expansion coefficient at 800° C. in the electrolyte layer of $10.0 \times 10^{-6}$/K, thus allowing for obtaining a desired fuel cell. It is also possible to replace the screen printing with a cold spray method or slip casting method, or to carry out these methods together with the screen printing.

While the present invention is described with a few embodiments, the present invention is not limited to these embodiments, and various changes can be made without departing from the features of the present invention.

For example, the configuration described in each of the above-described embodiments are not limited to the individual embodiments. For example, the details of the specifications of various configurations can be changed. Further, the configurations of each of the embodiments may be those other than the combinations of the above-described embodiments.

REFERENCE SIGNS LIST

FC Fuel cell
1 Cell structure
2 Supporting plate
11 Anode electrode layer
13 Electrolyte layer
15 Cathode electrode layer
21 Main body
23 Frame
111 Electrode reacting part
113 Outer peripheral part

The invention claimed is:

1. A fuel cell, comprising:
   a cell structure having a configuration in which an anode electrode layer, an electrolyte layer, and a cathode electrode layer are stacked,
   wherein the anode electrode layer has an electrode reacting part disposed in a middle and having a thermal expansion coefficient greater than a thermal expansion coefficient of the electrolyte layer, and an outer peripheral part arranged adjacent to the electrode reacting part on an outer periphery of the electrode reacting part and having a thermal expansion coefficient smaller than the thermal expansion coefficient of the electrode reacting part,
   wherein the outer peripheral part and the electrode reacting part each contain an anode catalyst and a solid electrolyte, and
   a content ratio of the anode catalyst of the outer peripheral part is less than a content ratio of the anode catalyst of the electrode reacting part.

2. The fuel cell according to claim 1, wherein
   the outer peripheral part differs from the electrolyte layer at least in one of a constituent of a component or a content ratio of a component.

3. The fuel cell according to claim 1, wherein
   the outer peripheral part has a same thickness as a thickness of the electrode reacting part at least at a vicinity of a boundary between the outer peripheral part and the electrode reacting part.

4. The fuel cell according to claim 1, wherein
   the outer peripheral part has a portion arranged in a way the portion overlaps with the cathode electrode layer in a plan view.

5. The fuel cell according to claim 1, wherein
   the outer peripheral part has a portion, whose thickness is gradually reduced towards an outer edge side.

6. The fuel cell according to claim 1, wherein
   a thickness of the outer peripheral part is gradually reduced towards an inner edge side, and the outer peripheral part has a portion, whose tip is arranged on an electrolyte layer side, and a thickness of the electrode reacting part is gradually reduced towards an outer edge side, and the electrode reacting part has a portion, whose tip is arranged on an opposite side of the electrolyte layer.

7. The fuel cell according to claim 1, further comprising a metallic supporting plate, which is disposed on an anode electrode layer side of the cell structure, and which supports the cell structure.

8. The fuel cell according to claim 7, wherein the supporting plate has a center main body having gas permeability and contacting the electrode reacting part of the anode electrode layer, and a frame, which is arranged on an outer periphery of the main body and which has gas impermeability.

9. The fuel cell according to claim 8, wherein the outer peripheral part has a portion, which is arranged in way the portion overlaps with at least one of the cathode electrode layer or the main body in a plan view.

10. The fuel cell according to claim 8, wherein the outer peripheral part has a portion, which is arranged in a way the portion overlaps with the main body in a plan view.

11. A fuel cell, comprising:
a cell structure having a configuration in which an anode electrode layer, an electrolyte layer, and a cathode electrode layer are stacked,
wherein the anode electrode layer has an electrode reacting part disposed in a middle and having a thermal expansion coefficient greater than a thermal expansion coefficient of the electrolyte layer, and an outer peripheral part arranged adjacent to the electrode reacting part on an outer periphery of the electrode reacting part and having a thermal expansion coefficient smaller than the thermal expansion coefficient of the electrode reacting part,
wherein the outer peripheral part has a portion, whose thickness is gradually reduced towards an outer edge side.

12. A fuel cell, comprising:
a cell structure having a configuration in which an anode electrode layer, an electrolyte layer, and a cathode electrode layer are stacked,
wherein the anode electrode layer has an electrode reacting part disposed in a middle and having a thermal expansion coefficient greater than a thermal expansion coefficient of the electrolyte layer, and an outer peripheral part arranged adjacent to the electrode reacting part on an outer periphery of the electrode reacting part and having a thermal expansion coefficient smaller than the thermal expansion coefficient of the electrode reacting part,
wherein a thickness of the outer peripheral part is gradually reduced towards an inner edge side, and the outer peripheral part has a portion, whose tip is arranged on an electrolyte layer side, and
a thickness of the electrode reacting part is gradually reduced towards an outer edge side, and the electrode reacting part has a portion, whose tip is arranged on an opposite side of the electrolyte layer.

* * * * *